United States Patent

Kowatari et al.

[19]

[11] Patent Number: 6,101,456

[45] Date of Patent: Aug. 8, 2000

[54] OUTPUT CORRECTING METHOD IN CONTROL SYSTEM, CONTROL SYSTEM, AND HYDRAULIC PUMP CONTROL SYSTEM

[75] Inventors: Youichi Kowatari, Ibaraki-ken; Toichi Hirata, Ushiku; Hidefumi Takegahara; Tsukasa Toyooka, both of Ibaraki-ken; Kouji Ishikawa, Tsuchiura; Genroku Sugiyama, Ibaraki-ken; Shigehiro Yoshinaga, Yokohama, all of Japan

[73] Assignee: Hitachi Construction Machinery Co., Ltd., Tokyo, Japan

[21] Appl. No.: 08/817,489

[22] PCT Filed: Sep. 5, 1996

[86] PCT No.: PCT/JP96/02517

§ 371 Date: Apr. 15, 1997

§ 102(e) Date: Apr. 15, 1997

[30] Foreign Application Priority Data

Mar. 7, 1995 [JP] Japan ....................................... 7-47032
Dec. 19, 1995 [JP] Japan ..................................... 7-330599

[51] Int. Cl.$^7$ .................................................. G05B 13/00
[52] U.S. Cl. ................ 702/105; 364/148.01; 364/528.17
[58] Field of Search ..................................... 702/105, 113, 702/114; 73/168; 37/234; 415/11; 364/130, 140.01, 141, 142, 148.01, 160, 165, 148.02, 528.17; 60/445, 447, 452

[56] References Cited

U.S. PATENT DOCUMENTS

| | | |
|---|---|---|
| 3,845,288 | 10/1974 | Cornyn, Jr. et al. . |
| 4,474,104 | 10/1984 | Creffield ................................. 91/497 |
| 4,558,424 | 12/1985 | Oguchi et al. . |
| 4,920,305 | 4/1990 | Benson et al. . |
| 5,126,933 | 6/1992 | White, III . |
| 5,267,440 | 12/1993 | Nakamura et al. ........................ 60/426 |
| 5,315,976 | 5/1994 | Birk et al. . |
| 5,560,387 | 10/1996 | Devier et al. ................................. 137/1 |
| 5,576,962 | 11/1996 | Ferguson et al. ................... 364/431.03 |
| 5,758,499 | 6/1998 | Sugiyama et al. .......................... 60/450 |
| 5,810,095 | 9/1998 | Orbach et al. ................................ 172/2 |

FOREIGN PATENT DOCUMENTS

| | | |
|---|---|---|
| 075 507 | 3/1983 | European Pat. Off. . |
| 240 048 | 10/1987 | European Pat. Off. . |
| 403 280 | 12/1990 | European Pat. Off. . |
| 565 737 | 10/1993 | European Pat. Off. . |
| 2-13159 | 4/1990 | Japan . |
| 2-231602 | 9/1990 | Japan . |
| 4-220701 | 8/1992 | Japan . |
| 5-057777 | 3/1993 | Japan . |
| 5-265509 | 10/1993 | Japan . |
| 6-48219 | 12/1994 | Japan . |
| 7-42199 | 2/1995 | Japan . |

*Primary Examiner*—Patrick Assouad
*Attorney, Agent, or Firm*—Fay, Sharpe, Beall, Fagan, Minnich & McKee

[57] ABSTRACT

A control system wherein a reverse characteristic having a reverse input/output relationship to a target input/output characteristic of a control object, is preset, and a target value for an output of the control object is calculated. A command signal corresponding to the target value then is determined based on the preset reverse characteristic, and the command signal is output to the control object. The control system includes first means for calculating a command signal corresponding to a given target value for the output of the control object based on the preset reverse characteristic, outputting the command signal to the control object, measuring an output of the control object and estimating a deviation between an actual input/output characteristic of the control object and the target input/output characteristic therefor, and storing data on the deviation between the input/output characteristics as learning correction data. The control system further includes second means for reading out the stored learning correction data and correcting the command signal using the learning correction data.

18 Claims, 33 Drawing Sheets

OUTPUT CORRECTING METHOD IN CONTROL SYSTEM, CONTROL SYSTEM, AND HYDRAULIC PUMP CONTROL SYSTEM

TECHNICAL FIELD

The present invention relates to an output correcting method in a control system, a control system, and a hydraulic pump control system, and more particularly to an output correcting method in a control system, a control system, and a hydraulic pump control system which are suitably employed to control the delivery rate of a variable displacement hydraulic pump mounted on hydraulic working machines such as hydraulic excavators.

BACKGROUND ART

Heretofore, a known hydraulic pump control system for controlling the delivery rate of a variable displacement hydraulic pump has been proposed in, e.g., JP-U-5-64506. This conventional control system comprises a variable displacement hydraulic pump, a hydraulic actuator driven by a hydraulic fluid delivered from the hydraulic pump, a flow control valve of a center bypass type controlling the flow rate of the hydraulic fluid supplied to the hydraulic actuator, a center bypass line extended from the hydraulic pump to a reservoir while penetrating a center bypass of the flow control valve, a throttle valve disposed in the center bypass line on the downstream side thereof for generating a control pressure (negative control pressure), a sensor for detecting a value of the generated control pressure, a controller for receiving a signal from the sensor, calculating a target pump tilting of the hydraulic pump and outputting a drive current corresponding to the calculated target pump tilting, a proportional solenoid valve for producing a command pressure corresponding to the drive current, and a regulator for controlling the tilting of the hydraulic pump in accordance with the command pressure from the proportional solenoid valve.

In the above construction, when the stroke amount of the flow control valve is small and the flow rate of the hydraulic fluid passing through the center bypass line is large, i.e., when the pressure upstream of the throttle valve is high, the controller calculates the target pump tilting so as to reduce the delivery rate of the hydraulic pump. When the stroke amount of the flow control valve is large and the flow rate of the hydraulic fluid passing through the center bypass line is small, i.e., when the pressure upstream of the throttle valve is low, the controller calculates the target pump tilting so as to increase the delivery rate of the hydraulic pump.

Further, the controller converts the target pump tilting calculated as mentioned above into a command value in the form of a drive current, and then outputs the drive current to the proportional solenoid valve. As a result, the proportional solenoid valve outputs a command pressure corresponding to the drive current, and the hydraulic fluid is delivered from the hydraulic pump at a flow rate corresponding to the target pump tilting.

DISCLOSURE OF THE INVENTION

However, the foregoing conventional control system has described below.

In the conventional control system, as stated above, the controller outputs a drive current corresponding to the calculated target pump tilting, the proportional solenoid valve produces a command pressure corresponding to the drive current, and the regulator controls the tilting of the hydraulic pump in accordance with the command pressure produced by the proportional solenoid valve. It is inevitable, however, that input/output characteristics of the proportional solenoid valve and the regulator have certain tolerances with respect to the target input/output characteristics, and characteristics of individual components vary depending on the components. Accordingly, even though the controller outputs a drive current corresponding to the target pump tilting based on the target input/output characteristics of the proportional solenoid valve and the regulator, there occurs a deviation between the target pump tilting and the actual pump tilting if an actual characteristic of the installed proportional solenoid valve or regulator is deviated from the target input/output characteristic thereof within the range of tolerance. The amount of such a deviation differs one by one for individual proportional solenoid valves or regulators. This gives rise to the problem that the actual pump tilting varies with respect to the target pump tilting depending on control systems.

Also, the above problem of the pump tilting being not properly controlled leads to another problem that it is difficult to control the actuator accurately. This problem causes an effect upon the operation in which a hydraulic working machine is required to precisely follow the operator's manipulation, particularly, upon such an operation as leveling or front positioning effected by a hydraulic excavator.

Similar problems as mentioned above exist in any other control systems wherein a target value of the output of a control object is calculated, a command signal corresponding to the calculated target value is determined, and the command signal is output to the control object, thereby controlling the control object through an open loop.

An object of the present invention is to provide an output correcting method in a control system and a control system with which, even if an input/output characteristic of a control object is varied, variations in output of the control object are reduced and proper control is achieved.

Another object of the present invention is to provide a hydraulic pump control system with which, even if an input/output characteristic of displacement control means of a variable displacement hydraulic pump is varied, variations in actual pump tilting as an output of the displacement control means are reduced and a hydraulic working machine can be operated at a proper driving speed in match with work to be carried out.

(1) To achieve the above objects, according to the present invention, in an output correcting method in a control system wherein a target value of output for a control object is calculated, a command signal corresponding to the target value is determined, and the command signal is output to the control object, the method comprises a first step of measuring an output of the control object and estimating a deviation between an input/output characteristic of the control object and a target input/output characteristic therefor, and a second step of correcting the command signal output to the control object in accordance with the deviation of the input/output characteristic estimated in the first step so that an output corresponding to the target input/output characteristic is obtained.

Thus, the first step estimates a deviation between an input/output characteristic of the control object and a target input/output characteristic therefor and the second step corrects the command signal output to the control object in accordance with the estimated deviation so that an output corresponding to the target input/output characteristic is obtained. This is essentially equivalent to that the control object is driven based on the target input/output characteristic for the target value of the output at that time. Therefore, variations in the output: are reduced and proper control is achieved.

(2) In the above output correcting method in the control system according to (1), preferably, the first step calculates a command signal corresponding to a given target value of output for the control object, outputs the command signal to the control object to measure an output of the control object, calculates a difference between the given target value and the measured value, and estimates the deviation of the input/output characteristic from the difference.

(3) In the above output correcting method in the control system according to (2), preferably, the first step calculates the command signal corresponding to the given target value based on a characteristic that is a reversal of the target input/output characteristic for the control object, and the second step calculates the command signal based on the characteristic that is a reversal of the target input/output characteristic for the control object whereupon the command signal is corrected in accordance with the deviation of the input/output characteristic.

(4) Also, to achieve the above objects, according to the present invention, in a control system wherein a target value of output for a control object is calculated, a command signal corresponding to the target value is determined, and the command signal is output to the control object, the control system comprises first means for measuring an output of the control object and estimating a deviation between an input/output characteristic of the control object and a target input/output characteristic therefor, and second means for correcting the command signal output to the control object in accordance with the deviation of the input/output characteristic estimated in the first means so that an output corresponding to the target input/output characteristic is obtained.

Thus, the first means estimates a deviation between an input/output characteristic of the control object and a target input/output characteristic therefor, and the second means corrects the command signal output to the control object in accordance with the estimated deviation so that an output corresponding to the target input/output characteristic is obtained. This is essentially equivalent to that the control object is driven based on the target input/output characteristic for the target value of the output at that time. Therefore, variations in the output are reduced and proper control is achieved.

(5) In the above control system according to (4), preferably, the first means includes third means for calculating a command signal corresponding to a given target value of output for the control object, outputting the command signal to the control object to measure an output of the control object, and fourth means for calculating a difference between the given target value and the measured value, and estimating the deviation of the input/output characteristic from the difference.

(6) In the above control system according to (5), preferably, the third means calculates the command signal corresponding to the given target value based on a characteristic that is a reversal of the target input/output characteristic for the control object, and the second means calculates the command signal based on the characteristic that is a reversal of the target input/output characteristic for the control object whereupon the command signal is corrected in accordance with the deviation of the input/output characteristic.

(7) In the above control system according to (5), preferably, the fourth means stores the difference between the given target value and the measured value as a value for estimating the deviation of the input/output characteristic, and the second means corrects the command signal by using the stored value as a correction value.

Assuming that the input/output characteristic of the control object is deviated substantially parallel from the target input/output characteristic, this feature enables the command signal to be corrected by the simplest calculation process.

(8) In the above control system according to (5), preferably, the fourth means stores the difference between the given target value and the measured value as a calculation formula for estimating the deviation of the input/output characteristic, and the second means calculates, as a correction value, the difference between the target value at that time and the corresponding measured value by using the calculation formula as a correction formula, and corrects the command signal by using the calculated correction value.

With this feature, even in the case of the input/output characteristic of the control object having a gradient different from the gradient of the target input/output characteristic, the command signal can be precisely corrected.

(9) In the above control system according to (7) or (8), preferably, the second means corrects the command signal by adding the correction value to the target value at that time.

(10) In the above control system according to (7) or (8), preferably, the second means shifts the characteristic used for calculating the command signal from the target value of output for the control object in an amount corresponding to the correction value, and corrects the command signal by calculating a command signal corresponding to the target value at that time from the shifted characteristic.

(11) In the above control system according to any one of (4) to (10), the control object includes, for example, displacement control means for a variable displacement hydraulic pump, and the target value is a target displacement of the hydraulic pump.

(12) Further, to achieve the above objects, according to the present invention, in a hydraulic pump control system wherein a target displacement as a target value of output for displacement control means for a variable displacement hydraulic pump is calculated, a command signal corresponding to the calculated displacement is determined, and the command signal is output to the displacement control means for controlling the displacement of the hydraulic pump, the control system comprises measuring means for measuring an actual displacement of the hydraulic pump, mode selecting means for selecting one of a learning control mode and a normal control mode, learning calculation means for, upon the learning control mode being selected by the mode selecting means, calculating a command signal corresponding to a given target displacement, outputting the command signal to the displacement control means, measuring an actual displacement of the hydraulic pump by the measuring means, and calculating a difference between the given target displacement and the actual displacement, and learning correction means for, upon the normal control mode being selected by the mode selecting means, correcting the command signal in accordance with the difference between the given target displacement and the actual displacement calculated by the learning calculation means.

When the learning control mode is selected, a deviation between the input/output characteristic of the displacement control means and the target input/output characteristic therefor can be estimated by calculating a difference between the given target displacement and the actual displacement measured by the measuring means, and when the normal control mode is selected, the command signal is corrected in accordance with the difference between the given target displacement and the actual displacement. This is essentially equivalent to that the displacement control means is driven based on the target input/output characteristic. Therefore, variations in actual pump tilting as the output of the displacement control means are reduced and a hydraulic working machine can be operated at a proper driving speed in match with work to be carried out.

(13) In the above hydraulic pump control system according to (12), preferably, the learning calculation means stores, as a correction value, the difference between the given target displacement and the actual displacement, and the learning correction means corrects the command signal by using the stored correction value.

Assuming that the input/output characteristic of the displacement control means is deviated parallel from the target input/output characteristic, this feature enables the command signal to be corrected by the simplest calculation process.

(14) In the above hydraulic pump control system according to (12), preferably, the learning calculation means stores, as a correction formula, the difference between the given target displacement and the actual displacement, and the learning correction means calculates, as a correction value, the difference between the target displacement at: that time and the corresponding actual displacement by using the correction formula, and corrects the command signal by using the calculated correction value.

With this feature, even in the case of the input/output characteristic of the displacement control means having a gradient different from the gradient of the target: input/output characteristic, the command signal can be precisely corrected.

(15) In the above hydraulic pump control system according to (14), preferably, the learning calculation means calculates the difference between the given target displacement and the actual displacement for each of at least two different target displacements, and derives the correction formula from data of the difference resulted for the at least two different target displacements.

(16) In the above hydraulic pump control system according to (14), preferably, the learning calculation means derives the correction formula as a correlation formula defined on a coordinate system with one axis representing the target displacement and the other axis representing the difference between the given target displacement and the actual displacement.

(17) In the above hydraulic pump control system according to (13) or (14), preferably, the learning correction means corrects the command signal by adding the correction value to the target displacement at that time.

(18) In the above hydraulic pump control system according to (13) or (14), preferably, the learning correction means shifts the characteristic used for calculating the command signal from the target displacement in an amount corresponding to the correction value, and corrects the command signal by calculating a command signal corresponding to the target displacement at that time from the shifted characteristic.

(19) In the above hydraulic pump control system according to (13) or (14), preferably, the learning calculation means includes a non-volatile memory in which data once stored will not be lost even after power is cut off, and stores the correction value or formula in the non-volatile memory.

With this feature, the correction value once stored can be employed for a long period of time and the need of operating the learning calculation means frequently is eliminated.

(20) In the above hydraulic pump control system according to (12), preferably, the learning calculation means calculates the command signal corresponding to the given target displacement based on a reversal of the target input/output characteristic of the displacement control means, and the learning correction means calculates the command signal based on the characteristic that is a reversal of the target input/output characteristic of the displacement control means whereupon the command signal is corrected by using the difference.

(21) In the above hydraulic pump control system according to (12), preferably, the mode selecting means includes switch means for instructing changeover between the learning control mode and the normal control mode so that one of the learning control mode and the normal control mode is selected in response to turning on/off of the switch means.

With this feature, the learning control mode can be selected to perform the learning control upon an operator manipulating the switch means only when required.

(22) In the above hydraulic pump control system according to (12), preferably, the learning calculation means determines whether the revolution speed of a prime mover for driving the hydraulic pump is within a predetermined range and whether a condition of the revolution speed being in the predetermined range has continued for a predetermined time, and only when the determination is satisfied, the learning calculation means calculates the command signal corresponding to the given target displacement and outputs the command signal to the displacement control means.

With this feature, the learning control is not performed during an inoperative state of the prime mover before the start-up or an instable state immediately after the start-up, and is performed only when the revolution speed of the prime mover is stabilized. As a result, the command signal can be corrected precisely.

(23) In the above hydraulic pump control system according to (12), preferably, when outputting the command signal to the displacement control means and measuring an actual displacement, the learning calculation means continues outputting the command signal for a predetermined time to stabilize the displacement of the hydraulic pump and, under a stabilized condition, measures the actual displacement by the measuring means, and further the learning calculation means receives a measured value of the actual displacement a predetermined number of times and calculates a difference between an averaged value of the actual displacement and the given target displacement.

With this feature, it is possible to prevent measurement of the displacement immediately after the start-up of the displacement control means, i.e, the displacement that does not yet reach the target value, average variations in the measured values, and correct the command signal precisely.

(24) In the above hydraulic pump control system according to (12), preferably, prior to outputting the command signal to the displacement control means, the learning calculation means outputs a command signal corresponding to a minimum target displacement to the displacement control means, thereby minimizing the target displacement of the hydraulic pump.

With this feature, when the learning calculation means drives the displacement control means, the hydraulic pump is always started to operate from the minimum target displacement. Therefore, even if there is a play in the displacement control means, the effect of such a play can be made constant and the measured values can be prevented from varying due to the effect of the play.

BEST MODE FOR CARRYING OUT THE INVENTION

Several embodiments of the present invention will be described hereunder with reference to the drawings.

A first embodiment of the present invention will be initially described with reference to FIGS. 1 to 17.

Figure 1:
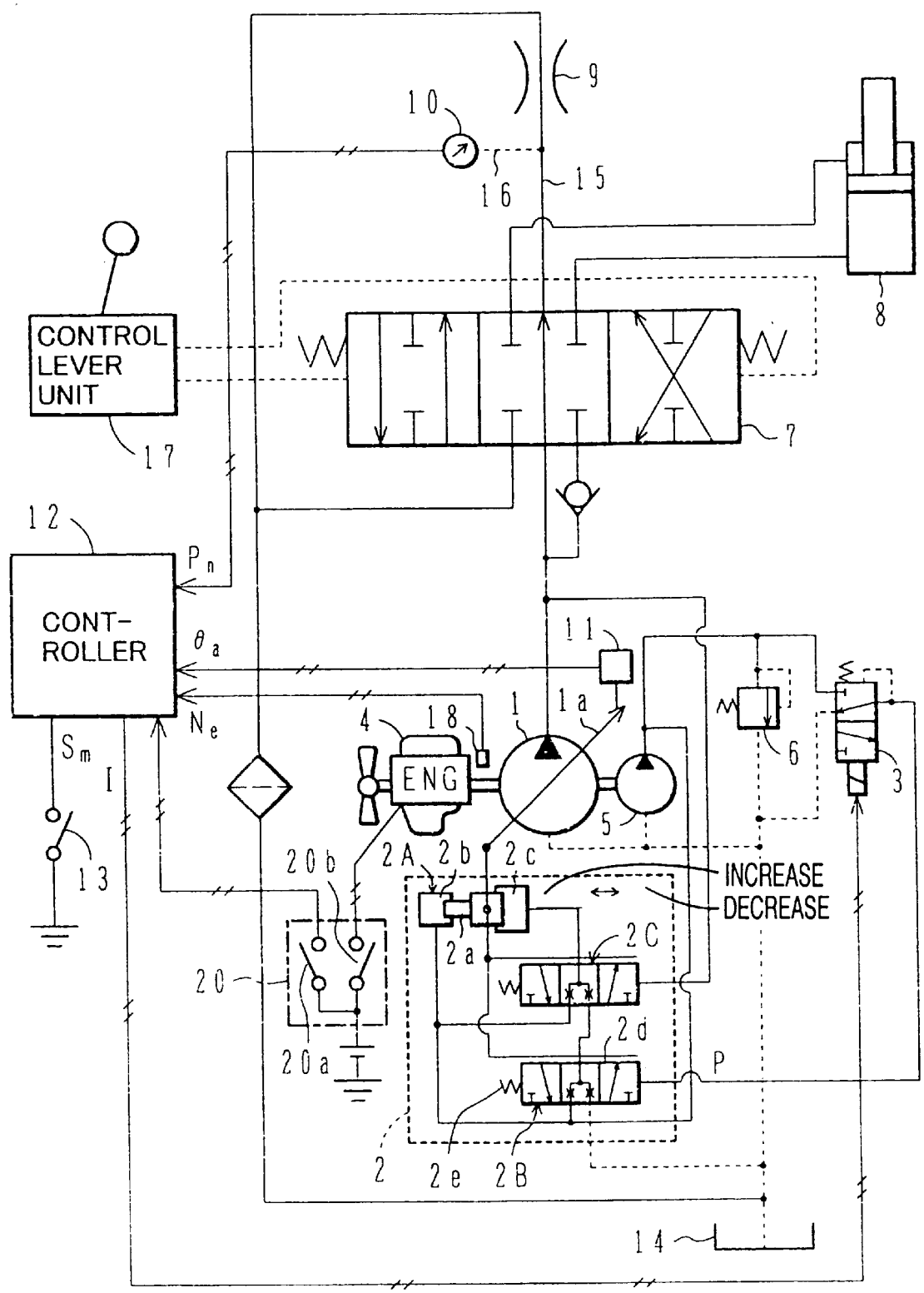
FIG. 1 is a diagram of a hydraulic circuit including a hydraulic pump control system according to a first embodiment of the present invention.

In FIG. 1, a hydraulic circuit according to this embodiment is equipped on a working machine such as a hydraulic excavator and comprises a variable displacement hydraulic pump 1, a reservoir 14, an engine 4 started up upon operation of a start-up switch 20b of a key switch 20 and driving the variable displacement hydraulic pump 1, a hydraulic cylinder 8 driven by a hydraulic fluid delivered from the variable displacement hydraulic pump 1, a flow control valve 7 of center bypass type controlling the hydraulic fluid delivered from the variable displacement hydraulic pump 1, a control lever unit 17 for controlling the flow control valve 7, and a center bypass passage 15 connected to the variable displacement hydraulic pump 1 and the reservoir 14.

A pump control system of this embodiment is adapted to control the delivery rate of the hydraulic pump 1 and comprises a pilot pump 5, a relief valve 6 for limiting the maximum delivery pressure of the pilot pump 5, a pressure generator, e.g., a throttle 9, disposed in a portion of the center bypass passage 15 between the reservoir 14 and the flow control valve 7 for generating a control pressure (hereinafter referred to as a negative control pressure) In corresponding to an input amount by which the control lever unit 17 is operated, a line 16 for introducing the negative control pressure Pn generated by the throttle 9 therethrough, a pressure sensor 10 for detecting the negative control pressure Pn introduced through the line 16 and converting the detected value into an electric signal, a pump tilting angle sensor 11 for detecting a tilting angle (hereinafter referred to as an actual pump tilting) θ of a swash plate 1a of the hydraulic pump 1 and converting the detected value into an electric signal, a revolution speed sensor 18 for detecting a revolution speed Ne of the engine 4 and converting the detected value into an electric signal, a mode switch 13 for switching a control mode described later between a normal control mode and a learning control mode, and turning a mode signal Sm off when the normal control mode is selected and on when the learning control mode is selected, a controller 12 for, when supplied with power upon a power switch 20a of the key switch 20 being turned on, receiving the actual pump tilting θ detected by the pump tilting angle sensor 11, the engine revolution speed Ne detected by the revolution speed sensor 18 and the mode signal Sm from the mode switch 13, executing a predetermined calculation process, and outputting a drive current I dependent on the calculation result, a proportional solenoid valve 3 driven by the drive current I from the controller 12 and producing a command pressure P with a hydraulic fluid from the pilot pump 5, and a regulator 2 for controlling the tilting of the swash plate 1a of the hydraulic pump 1 and hence the displacement thereof in accordance with the command pressure P produced by the proportional solenoid valve 3.

The regulator 2 comprises an actuator 2A for operating the swash plate 1a, a flow control selector valve 2B for controlling the operation of the actuator 2A in accordance with the command pressure P from the proportional solenoid valve 3, and a horsepower control selector valve 2C. The actuator 2A comprises a servo piston 2a having pressure bearing areas at opposite ends different from each other and coupled to the swash plate 1a for operating the swash plate 1a, a smaller-diameter side chamber 2b housing therein a smaller-diameter portion of the servo piston 2a, and a larger-diameter side chamber 2c housing therein a larger-diameter portion of the servo piston 2a. The flow control selector valve 2B comprises a control spool 2d and a spring 2e disposed at one end of the control spool 2d. The command pressure P from the proportional solenoid valve 3 is supplied to the other end of the control spool 2d opposed to the spring 2e. The position of the control spool 2d is determined under balance between the command pressure P and the biasing force of the spring 2e. More specifically, if the command pressure P from the proportional solenoid valve 3 is higher than the set value of the spring 2e, the control spool 2d is moved to a right-hand shift position as viewed on the drawing, whereupon the hydraulic fluid from the pilot pump 5 is supplied to both the smaller-diameter side chamber 2b and the larger-diameter side chamber 2c. Therefore, the difference in pressure bearing area between the smaller-diameter side chamber 2b and the larger-diameter side chamber 2c causes the servo piston 2a to move to the left as viewed on the drawing, i.e., in the direction to increase the tilting amount of the swash plate 1a. Conversely, if the command pressure P from the proportional solenoid valve 3 is lower than the set value of the spring 2e, the control spool 2d is moved to a left-hand shift position as viewed on the drawing, whereupon the hydraulic fluid from the pilot pump 5 is supplied to the smaller-diameter side chamber 2b alone, while the larger-diameter side chamber 2c is communicated with the reservoir 14. Therefore, the servo piston 2a is moved to the right as viewed on the drawing, i.e., in the direction to decrease the tilting amount of the swash plate 1a.

Figure 2:
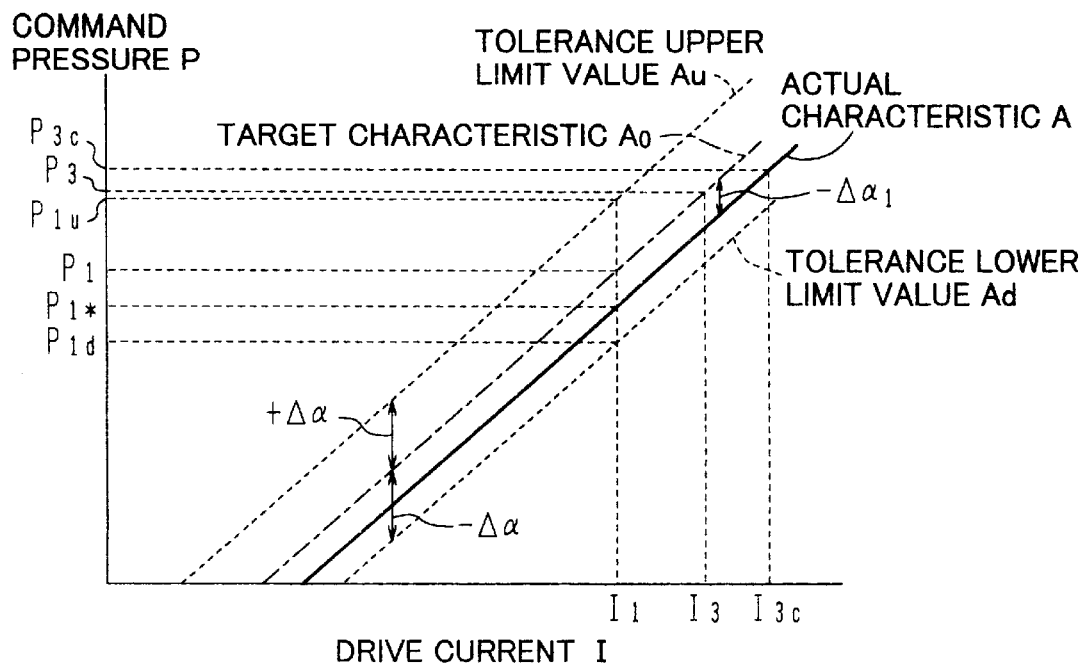
FIG. 2 is a graph showing a characteristic (drive current—command pressure) of a proportional solenoid valve shown in FIG. 1.

An input/output characteristic of the proportional solenoid valve 3 is shown by "actual characteristic A" in FIG. 2. The characteristic A is such that the command pressure P is increased as the drive current I increases. Also, for each of individual proportional solenoid valves, the characteristic A varies within a tolerance of $\pm\Delta\alpha$ relative to a target characteristic Ao of the proportional solenoid valve 3. For example, when a current value $I_1$ is input as the drive current I, a proportional solenoid valve with its actual characteristic A given by the target characteristic Ao outputs a command pressure $P_1$, a proportional solenoid valve with its actual characteristic A given by a tolerance upper limit value Au outputs a command pressure $P_{1u}$, and a proportional solenoid valve with its actual characteristic A given by a tolerance lower limit value Ad outputs a command pressure $P_{1d}$. As indicated by "actual characteristic B" in FIG. 3, an input/output characteristic of the regulator 2 is also such that the pump tilting e is increased as the command pressure P increases. Likewise, for each of individual regulators, the characteristic B varies within a tolerance of $\pm\Delta\beta$ (between a tolerance upper limit value Bu and a tolerance lower limit value Bd) relative to a target characteristic Bo of the regulator 2. Here, the target characteristic Ao of the proportional solenoid valve 3 and the target characteristic Bo of the regulator 2 are characteristics preset as design values.

Figure 4:
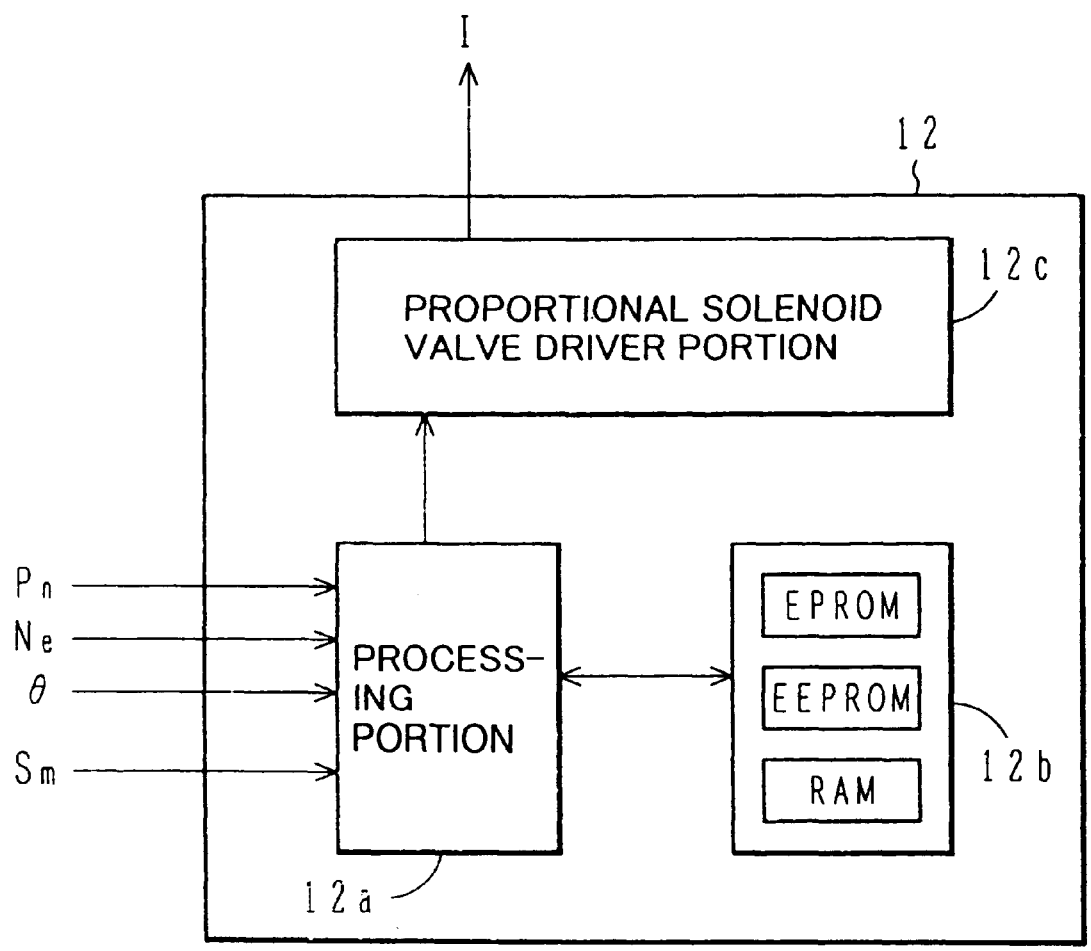
FIG. 4 is a block diagram showing the hardware configuration of a controller shown in FIG. 1.

The controller 12 comprises, as shown in FIG. 4, a processing portion 12a, a storage portion 12b, and a proportional solenoid valve driver portion 12c. The processing portion 12a carries out a predetermined calculation process based on the negative control pressure Pn, the actual pump tilting θ, the engine revolution speed Ne, and the mode signal Sm. The storage portion 12b includes an EPROM in which programs and characteristic data necessary for executing the predetermined calculation process are stored beforehand, a non-volatile memory, e.g., an EEPROM, in which a correction value $\Delta\theta_0$ determined in a process of the learning control mode, described later, is stored and data once stored will not be lost even after the power supplied to the controller 12 is cut off, and a RAM in which values produced during the calculation process are stored temporarily. The proportional solenoid valve driver portion 12c outputs the drive current I corresponding to the calculation result to the proportional solenoid valve 3.

Figure 5:
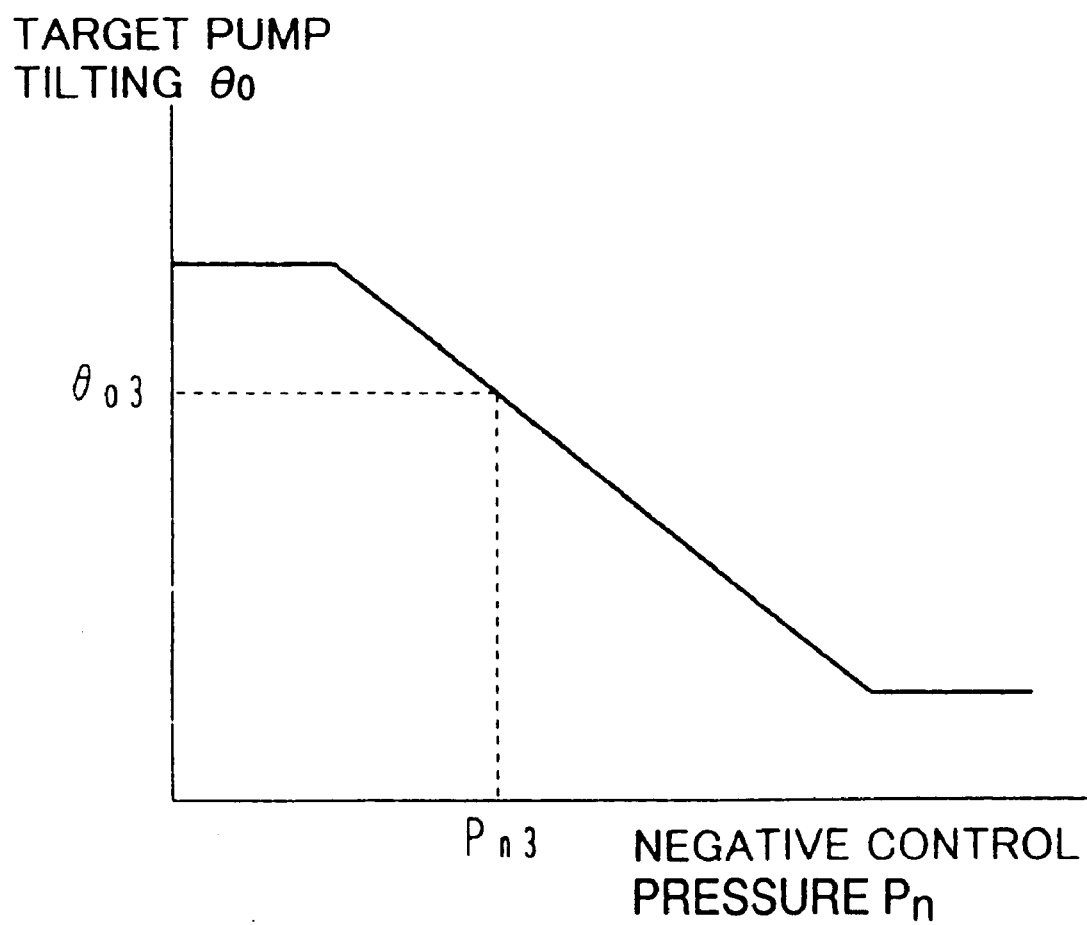
FIG. 5 is a graph showing a characteristic (negative control pressure—target pump tilting) of a target pump tilting table stored in the controller shown in FIG. 1.
Figure 6:
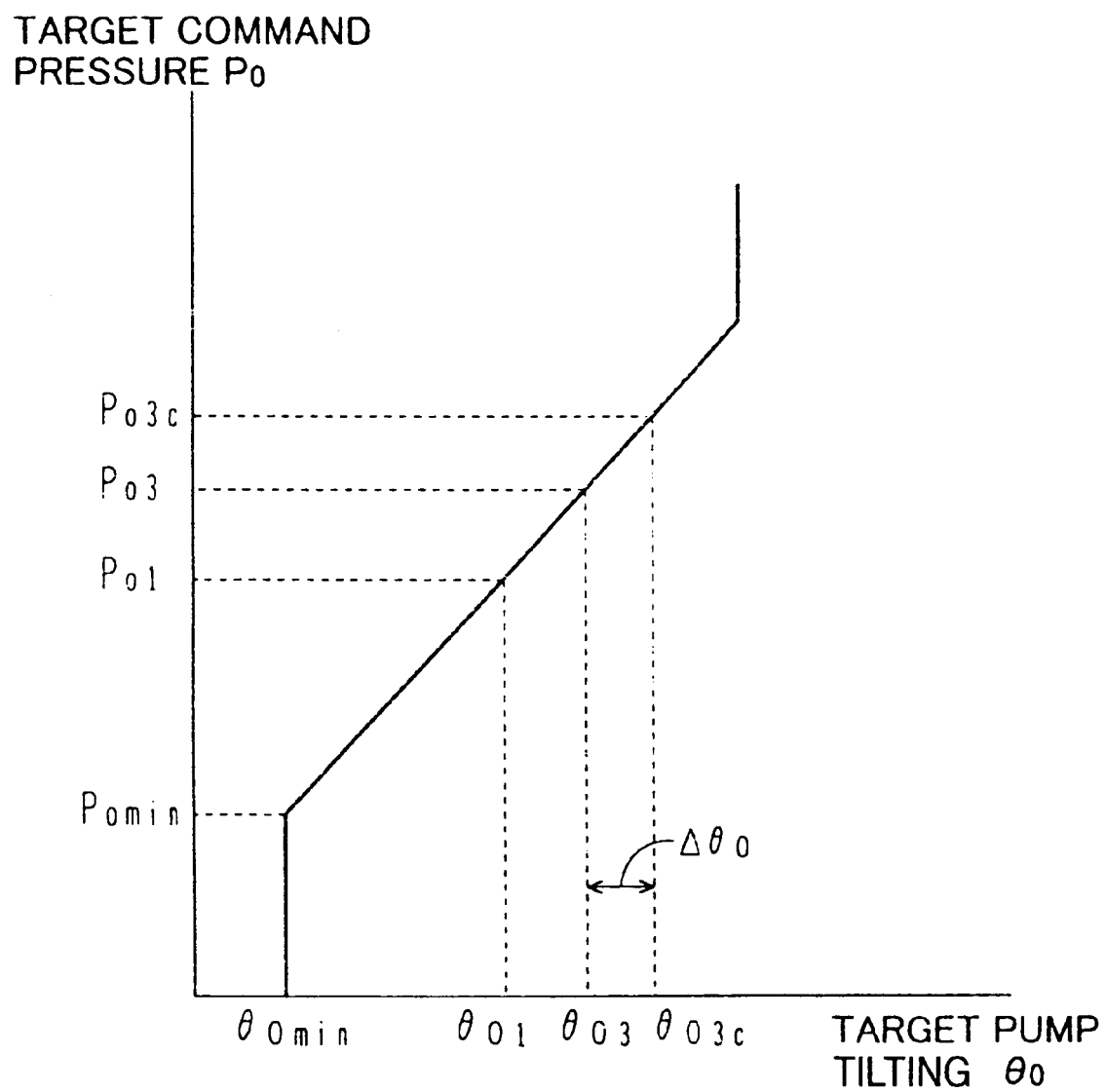
FIG. 6 is a graph showing a characteristic (target pump tilting—target command pressure) of a target command pressure table stored in the controller shown in FIG. 1.
Figure 7:
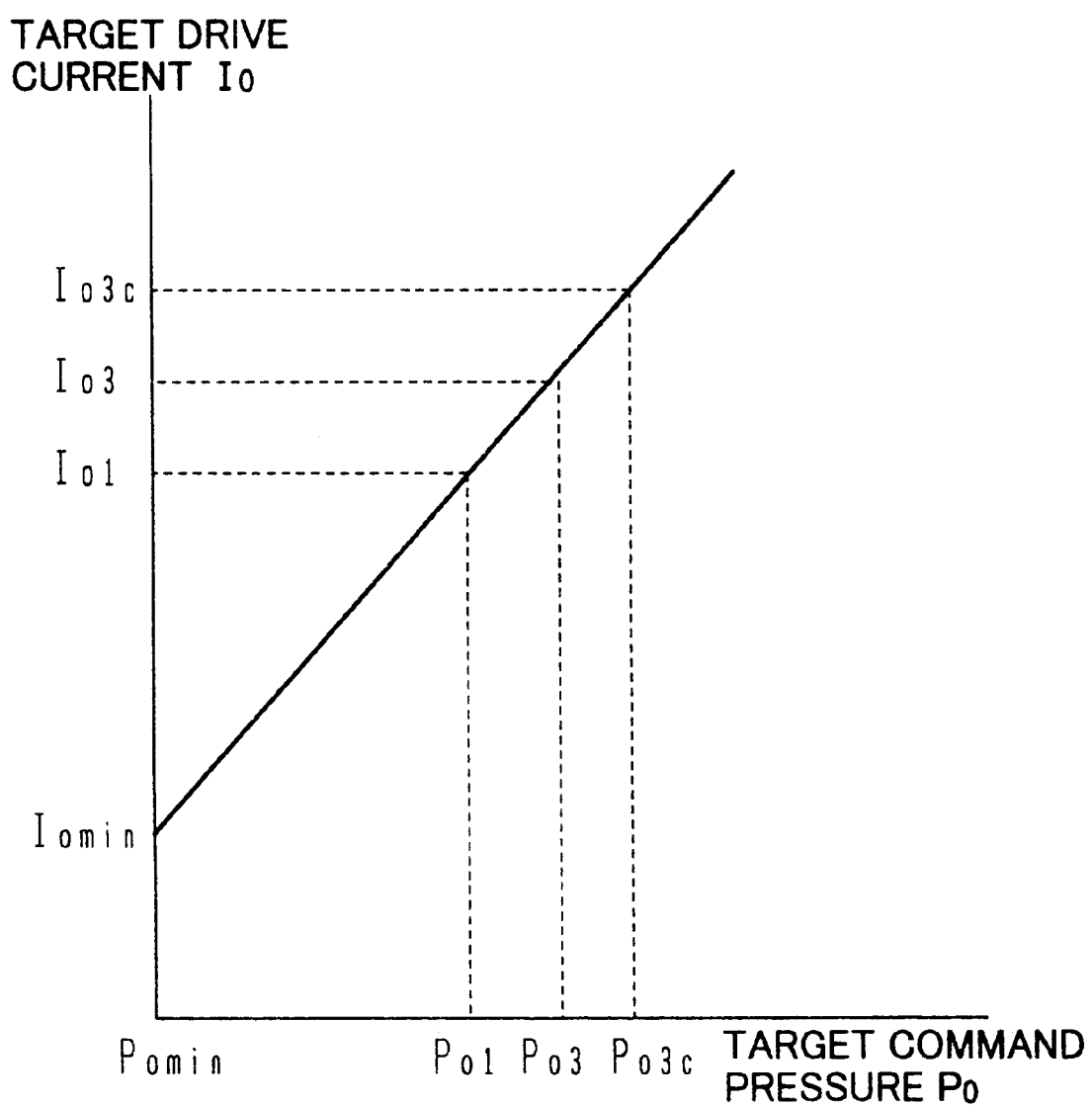
FIG. 7 is a graph showing a characteristic (target command pressure—target drive current) of a target drive current table stored in the controller shown in FIG. 1.
Figure 8:
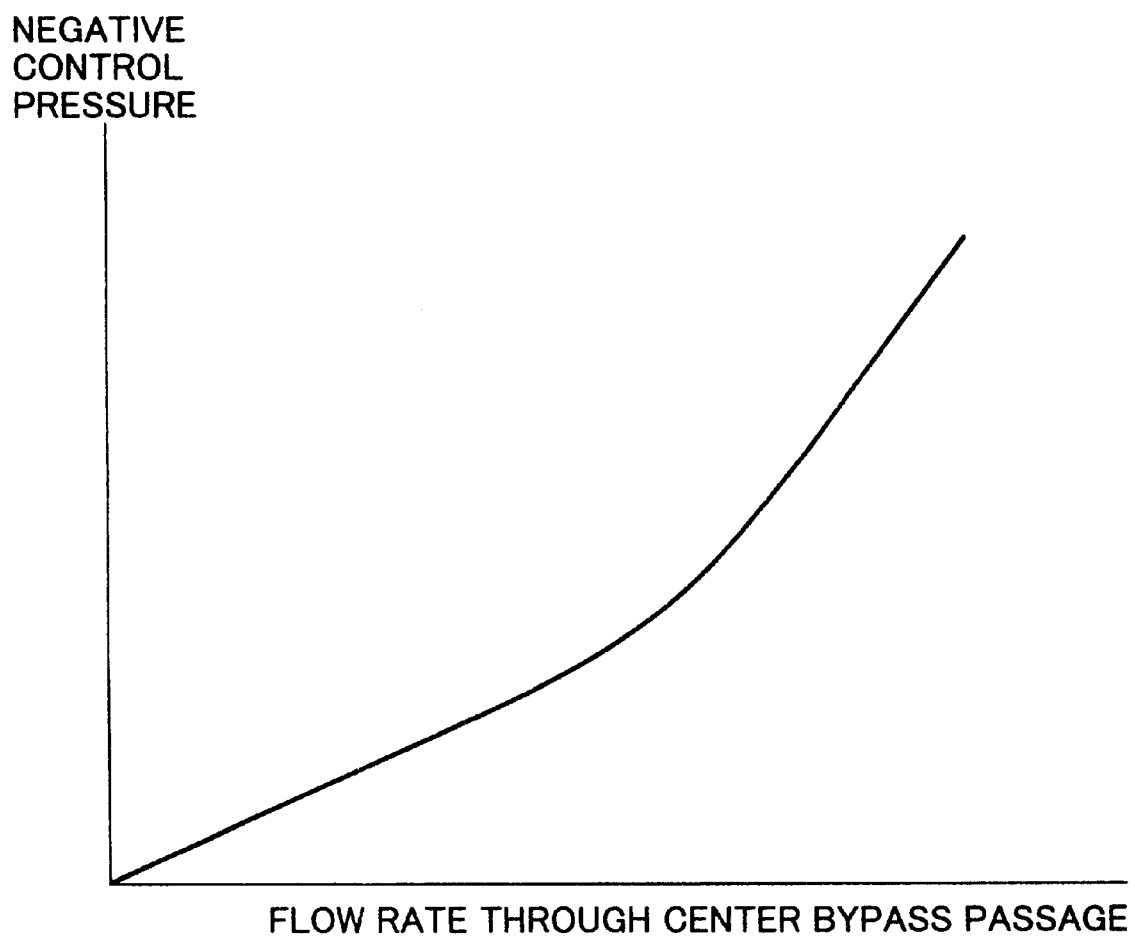
FIG. 8 is a graph showing a characteristic (center bypass flow rate—negative control pressure) of a pressure generator shown in FIG. 1.

The characteristic data stored in the EPROM of the storage portion 12b are shown in FIGS. 5 to 7. FIG. 5 is a graph showing a target pump tilting table used for determining a target pump tilting $\theta_0$ from the negative control pressure Pn. Now, when the operator manipulates a control lever of the control lever unit 17 to move the flow control valve 7, the center bypass passage 15 is throttled and the flow rate of the hydraulic fluid passing through the center bypass passage, i.e., the center bypass flow rate, is reduced as the stroke amount of the flow control valve 7 (i.e., the demanded flow rate) increases. Also, as shown in FIG. 8, the negative control pressure is reduced as the center bypass flow rate reduces. In the characteristic shown in FIG. 5, therefore, the relationship between the negative control pressure Pn and the target pump tilting $\theta_0$ is set such that when the center bypass flow rate is large, the tilting amount of the swash plate 1a of the hydraulic pump 1 is reduced to reduce the pump delivery rate, and when the center bypass flow rate is small, the tilting amount of the swash plate 1a of the hydraulic pump 1 is increased to increase the pump delivery rate.

FIG. 6 is a graph showing a target command value pressure table used for determining a target command pressure $P_0$ as a target output of the proportional solenoid valve 3 from the target pump tilting $\theta_0$. The plotted characteristic is a reversal, i.e., the reverse, of the target characteristic Bo of the regulator 2 shown in FIG. 3.

FIG. 7 is a graph showing a target drive current table used for determining a target drive current $I_0$ as a target input to the proportional solenoid valve 3 from the target command pressure $P_0$. A characteristic of the plotted table is a reversal, i.e., the reverse, of the target characteristic Ao of the proportional solenoid valve 3 shown in FIG. 2.

The processing procedures of the controller 12 will be described with reference to FIGS. 9 to 15.

Figure 9:
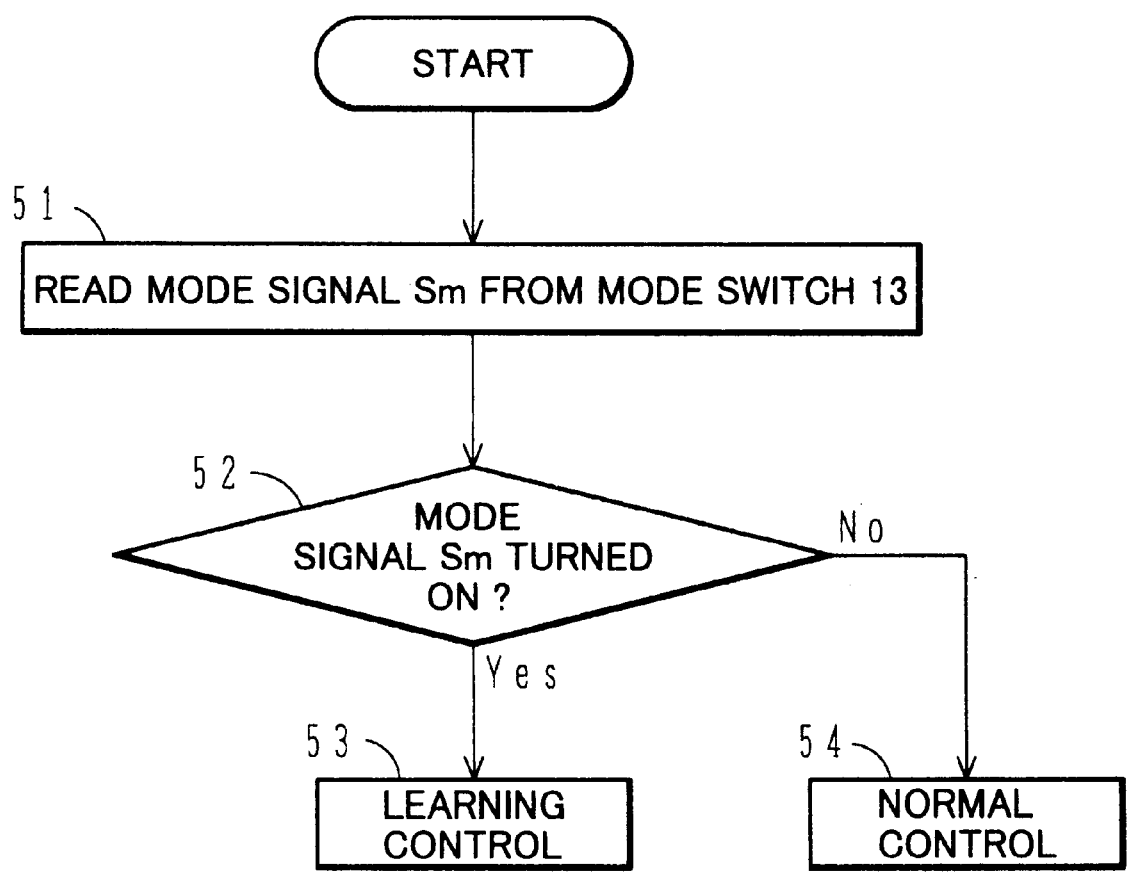
FIG. 9 is a flowchart showing general processing procedures of the controller shown in FIG. 1.

FIG. 9 is a flowchart showing the general processing procedures of the controller 12.

First, when the controller is supplied with power upon the power switch 20a of the key switch 20 being turned on, it reads the mode signal Sm from the mode switch 13 (step 51). This process is executed each time the power switch 20a is turned on. Then, the controller determines whether the mode signal Sm is turned on or not (step 52). If the mode signal Sm is determined being on, the controller executes a process of the learning control mode (step 53), and if the mode signal Sm is determined being off, the controller executes a process of the normal control mode (step 54). In this embodiment, the control flow is designed not to return to the normal control mode until the mode switch 13 is changed over, once switched into the learning control mode. However, the control flow may be designed to return to the normal control mode automatically after the elapse of a certain period of time.

Figure 10:
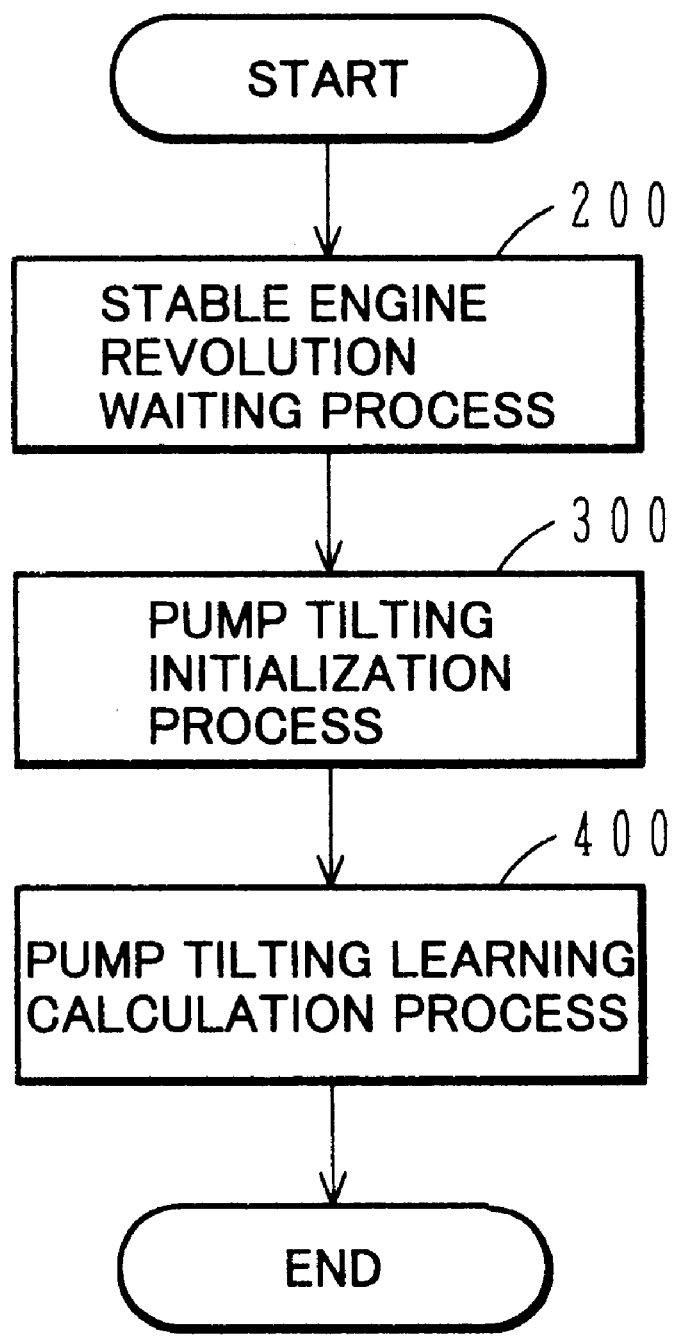
FIG. 10 is a flowchart showing processing procedures of a learning control mode in the procedures shown in FIG. 9.

The general processing procedures of the learning control mode are shown in a flowchart of FIG. 10.

As a first step of the learning control mode process, the controller 12 initially executes a stable engine revolution waiting process 200 in which it waits until the revolution speed of the engine 4 reaches a prescribed value. Thus, the learning control is not performed during an inoperative state of the engine 4 before the start-up or an instable state immediately after the start-up, and is performed only when the engine 4 is stabilized at the prescribed revolution speed. Then, the controller 12 executes a pump tilting initialization process 300 for minimizing the tilting of the swash plate 1a of the hydraulic pump 1. This process 300 is to operate the swash plate 1a of the hydraulic pump 1 from a minimum tilting whenever the swash plate 1a is operated under the learning control, measure the tilting of the hydraulic pump 1 on condition that the effects of plays in the swash plate driving system are constant, and hence prevent the measured value from varying due to the effects of the plays. After having been thus prepared, the controller executes a pump tilting learning calculation process 400.

Figure 11:
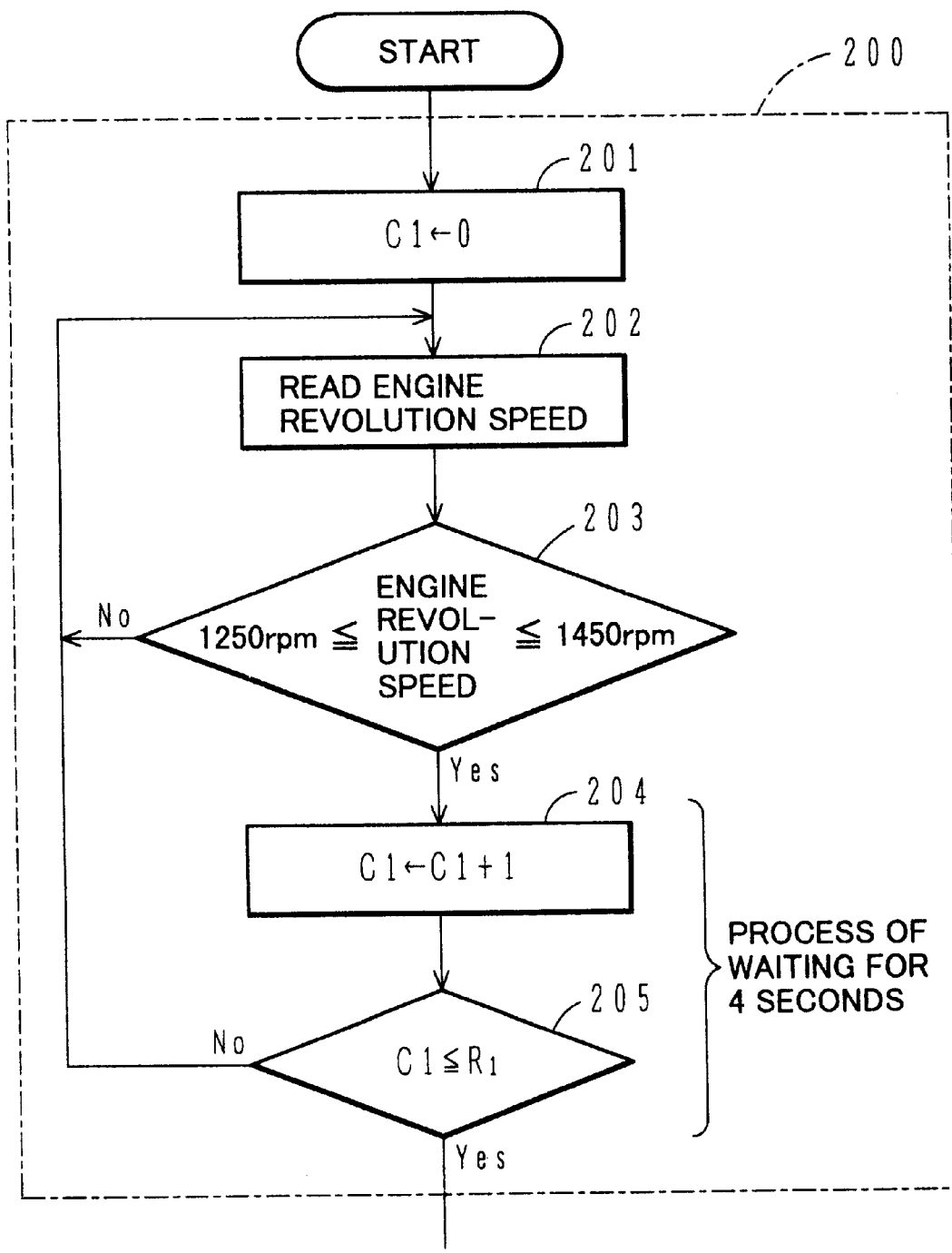
FIG. 11 is a flowchart showing details of a stable engine revolution waiting process in the procedures shown in FIG. 10.

Details of the stable engine revolution waiting process 200 are shown in a flowchart of FIG. 11. First, the controller puts zero (0) in a waiting time counter C1 (step 201) for setting a predetermined time during which it waits for the engine revolution speed being stabilized, e.g., 4 seconds. Subsequently, the controller reads the revolution speed Ne of the engine 4 detected by the engine revolution sensor 18 (step 202), and determines whether the engine revolution speed Ne reaches a prescribed value, e.g., a revolution speed within the range of 1350 rpm±100 rpm (step 203). If the prescribed revolution speed is not reached, the process of reading the engine revolution speed Ne (step 202) is repeated again. If the prescribed revolution speed is reached, one (1) is added to the waiting time counter C1 (step 204). It is then determined whether C1 is not less than a set value R1, i.e., 4 seconds in this embodiment (step 205). Unless C1 is not less than 4 seconds, the controller returns to the step 202 of reading the engine revolution speed Ne, thereby repeating the above procedures until C1 becomes not less than 4 seconds. If C1 is not less than 4 seconds, the stable engine revolution waiting process 200 is ended for transition to the pump tilting initialization process 300.

Figure 12:
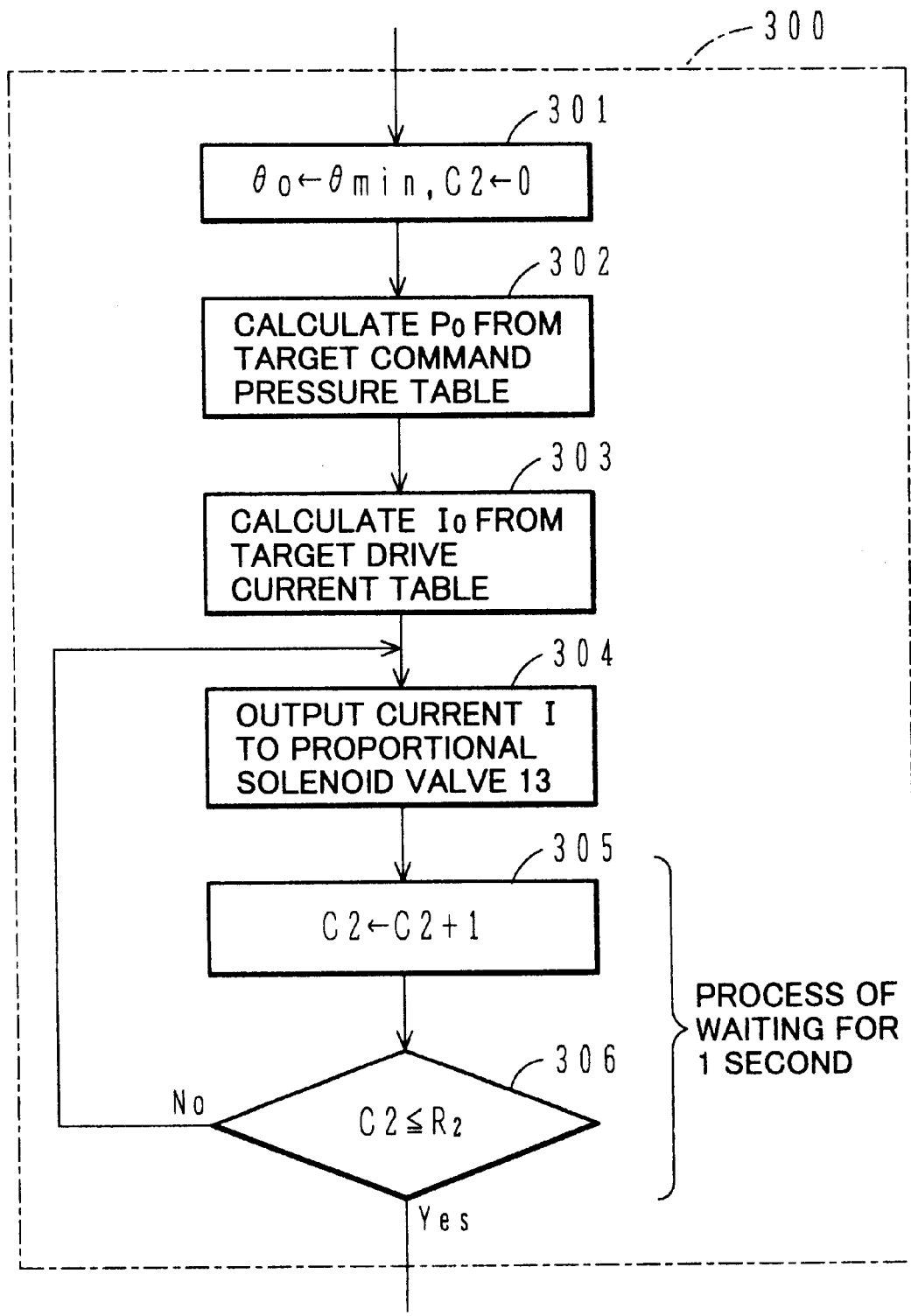
FIG. 12 is a flowchart showing details of a pump tilting initialization process in the procedures shown in FIG. 10.

Details of the pump tilting initialization process 300 are shown in a flowchart of FIG. 12. First, the controller sets a minimum tilting $\theta_{0\ min}$ to the target pump tilting $\theta_0$ (step 301). Also, because a certain time is required until the output of the proportional solenoid valve 3 is transmitted from the regulator 2 to the swash plate 1a and the target pump tilting is established, the controller puts zero (0) in a waiting time counter C2 (step 301) for setting a predetermined time, e.g., 1 second. Subsequently, a target command pressure $P_0$ (=$P_{0\ min}$) corresponding to the target pump tilting $\theta_0$ (set to $\theta_{0\ min}$) is calculated based on the characteristic of the target command pressure table shown in FIG. 6 (step 302). Then, a target drive current $I_0$ (=$I_{0\ min}$) corresponding to the target command pressure $P_0$ (=$P_{0\ min}$) is calculated based on the characteristic of the target drive current table shown in FIG. 7 (step 303). After that, a drive current I (=$I_{min}$) corresponding to the target drive current $I_{0\ min}$ is output to the proportional solenoid valve 3 from the proportional solenoid valve driver portion 12c of the controller 12 (step 304). After adding one (1) to the waiting time counter C2 (step 305), the controller determines whether C2 is not less than a set value R2, i.e., 1 second in this embodiment (step 306). Unless C2 is not less than 1 second, the controller returns to the step 304 of outputting the drive current I (=$I_{min}$) corresponding to the target drive current $I_{0\ min}$ to the proportional solenoid valve 3, thereby repeating the above procedures until C2 becomes not less than 1 second. If C2 is not less than 1 second, the pump tilting initialization process 300 is ended for transition to the pump tilting learning calculation process 400.

Figure 13:
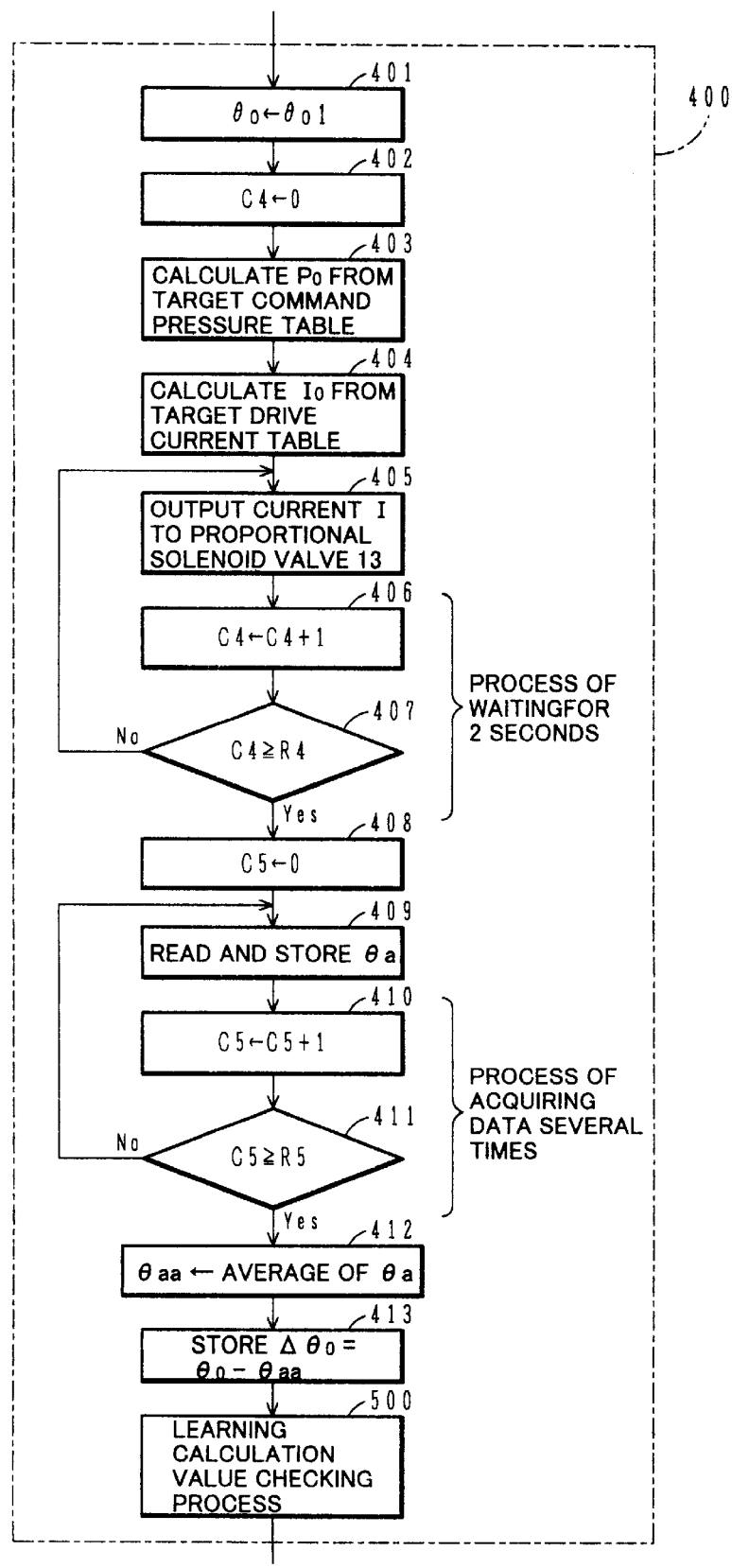
FIG. 13 is a flowchart showing details of a pump tilting learning calculation process in the procedures shown in FIG. 10.

Details of the pump tilting learning calculation process 400 are shown in a flowchart of FIG. 13. First, the controller sets a predetermined tilting $\theta_{01}$ to the target pump tilting $\theta_0$ (step 401). Also, because a certain time is required until the output of the proportional solenoid valve 3 is transmitted from the regulator 2 to the swash plate 1a and the target pump tilting is established, the controller puts zero (0) in a waiting time counter C4 (step 402) for setting a predetermined time, e.g., 2 seconds. Subsequently, a target command pressure $P_0$ (=$P_{01}$) corresponding to the target pump tilting $\theta_0$ (set to $\theta_{01}$) is calculated based on the characteristic of the target command pressure table shown in FIG. 6 (step 303). Then, a target drive current $I_0$ (=$I_{01}$) corresponding to the target command pressure $P_0$ (=$P_{01}$) is calculated based on the characteristic of the target drive current table shown in FIG. 7 (step 404). After that, a drive current I (=$I_1$) corresponding to the target drive current $I_{01}$ is output to the proportional solenoid valve 3 from the proportional solenoid valve driver portion 12c of the controller 12 (step 405). After adding one (1) to the waiting time counter C4 (step 406), the controller determines whether C4 is not less than a set value R4, i.e., 2 seconds in this embodiment (step 407). Unless C4 is not less than 2 seconds, the controller returns to the step 405 of outputting the drive current I ($=I_1$) corresponding to the target drive current $I_{01}$ to the proportional solenoid valve 3, thereby repeating the above procedures until C4 becomes not less than 2 seconds.

Upon the elapse of a time not less than 2 seconds after the output of the drive current I ($=I_1$), the controller puts zero (0) in a number-of-reading-cycles counter C5 (step 408) for setting the number of times that; it reads the detected value. Then, the controller reads an actual pump tilting $\theta_a$ ($=\theta_{1*}$; see FIG. 3) detected by the tilting angle sensor 11 and stores it in the RAM of the storage portion 12b (step 409). After adding one (1) to the number-of-reading-cycles counter C5 (step 410), the controller determines whether C5 is not less than a set number of times R5, i.e., 10 in this embodiment (step 411). Unless C5 is not less than the number of times R5, the controller returns to the step 409 of reading the actual pump tilting $\theta_a$ ($=\theta_{1*}$) detected by the tilting angle sensor 11, thereby repeating the above procedures until C5 becomes not less than the number of times R5. Accordingly, data of the actual pump tilting $\theta_a$ in number R5 (10) are stored in the RAM of the storage portion 12b.

Subsequently, taking into account variations in the actual pump tilting $\theta_a$ ($=\theta_{1*}$), an averaging process of dividing the stored data of $\theta_a$ in number R5 by R5 is executed to calculate an average actual pump tilting $\theta_{aa}$ (step 412). Then, a difference $\Delta\theta_0$ ($=\theta_0-\theta_{aa}$) between the target pump tilting $\theta_0$ ($=\theta_{01}$) and the average actual pump tilting $\theta_{aa}$ is determined and stored as a correction value in the EEPROM of the storage portion 12b (step 413).

Figure 3:
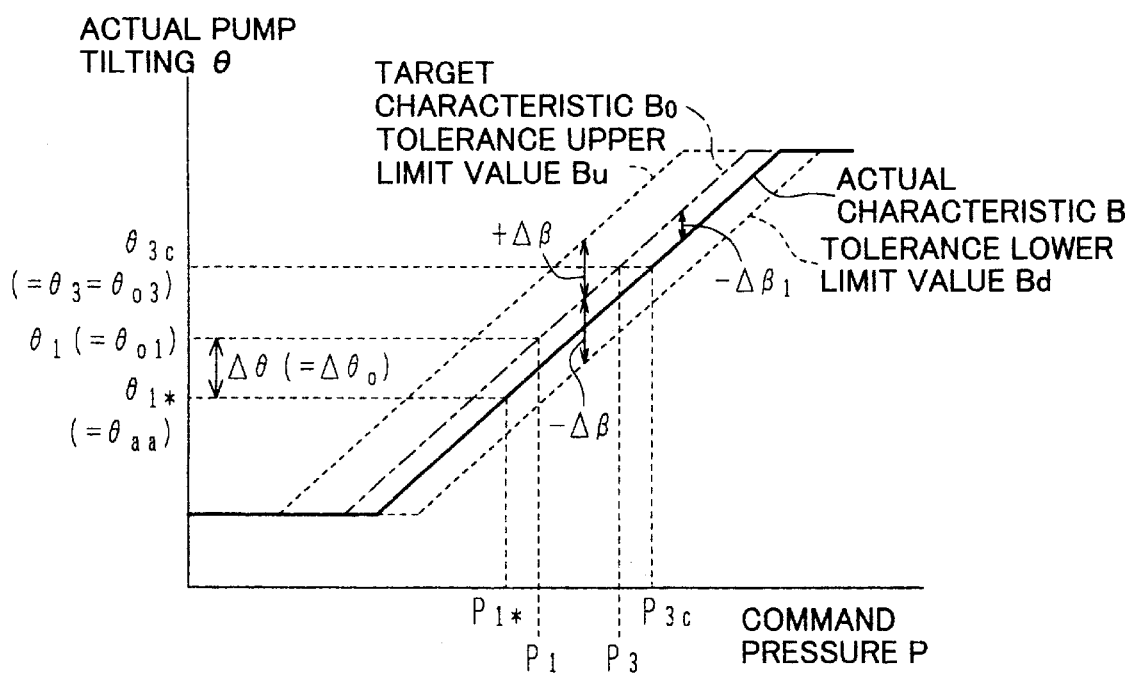
FIG. 3 is a graph showing a characteristic (command pressure—actual pump tilting) of a regulator shown in FIG. 1.

Here, if the characteristics of the proportional solenoid valve 3 and the regulator 2 are respectively in agreement with the target characteristics Ao, Bo shown in FIGS. 2 and 3, the proportional solenoid valve 3 should output the command pressure $P_1$ corresponding to the drive current $I_1$ and the regulator 2 should provide the pump tilting $\theta_1$ ($=\theta_{01}$) corresponding to the command pressure $P_1$, when the drive current $I_1$ corresponding to the target pump tilting $\theta_{01}$ is output to the proportional solenoid valve 3 through the steps 402 to 405. In practice, however, the actual characteristics of the proportional solenoid valve 3 and the regulator 2 are varied as indicated by A and B, respectively until in FIGS. 2 and 3. Therefore, when the drive current $I_1$ is output to the proportional solenoid valve 3, the proportional solenoid valve 3 outputs a command pressure $P_{1*}$ corresponding to the drive current $I_1$ and the regulator 2 provides an actual pump tilting $\theta_{1*}$ (average actual pump tilting $\theta_{aa}$) corresponding to the command pressure $P_{1*}$. Thus, $\Delta\theta_0$ ($=\theta_0-\theta_{aa}$) determined in the step 413 corresponds to the difference between the pump tilting $\theta_1$ based on the target characteristic resulted when the target pump tilting $\theta_0$ is $\theta_{01}$ and the actual pump tilting is $\theta_{1*}$. From that difference, respective deviations between the actual input/output characteristics A, B and the target input/output characteristics Ao, Bo of the proportional solenoid valve 3 and the regulator 2 can be estimated. Specifically, in the case where the actual input/output characteristics A, B of the proportional solenoid valve 3 and the regulator 2 are deviated parallel from the target input/output characteristics Ao, Bo (with the characteristic lines having the same gradients) like this embodiment, the deviations of the input/output characteristics of the proportional solenoid valve 3 and the regulator 2 can be expressed by the difference $\Delta\theta_0$ ($=\theta_0-\theta_{aa}$). Even in the case where the actual input/output characteristics A, B are deviated not parallel from the target input/output characteristics Ao, Bo, the deviations of the input/output characteristics can be expressed by the difference $\Delta\theta_0$ ($=\theta_0-\theta_{aa}$), if the deviations differ from each other in a small amount or are within the range allowable in the correction control according to the present invention. In other words, by estimating the deviations between the actual input/output characteristics A, B and the target input/output characteristics Ao, Bo based on the difference $\Delta\theta_0$ ($=\theta_0-\theta_{aa}$) and adding it, as a correction value, to the target pump tilting $\theta_0$ ($=\theta_{01}$), it is possible to obtain the pump tilting $\theta_1$ in accordance with the target characteristics free from variations (as described later in more detail).

After storing the correction value $\Delta\theta_0$ in the RAM of the storage portion 12b, the controller executes a learning calculation value checking process 500 for checking whether the correction value is a properly calculated value.

Figure 14:
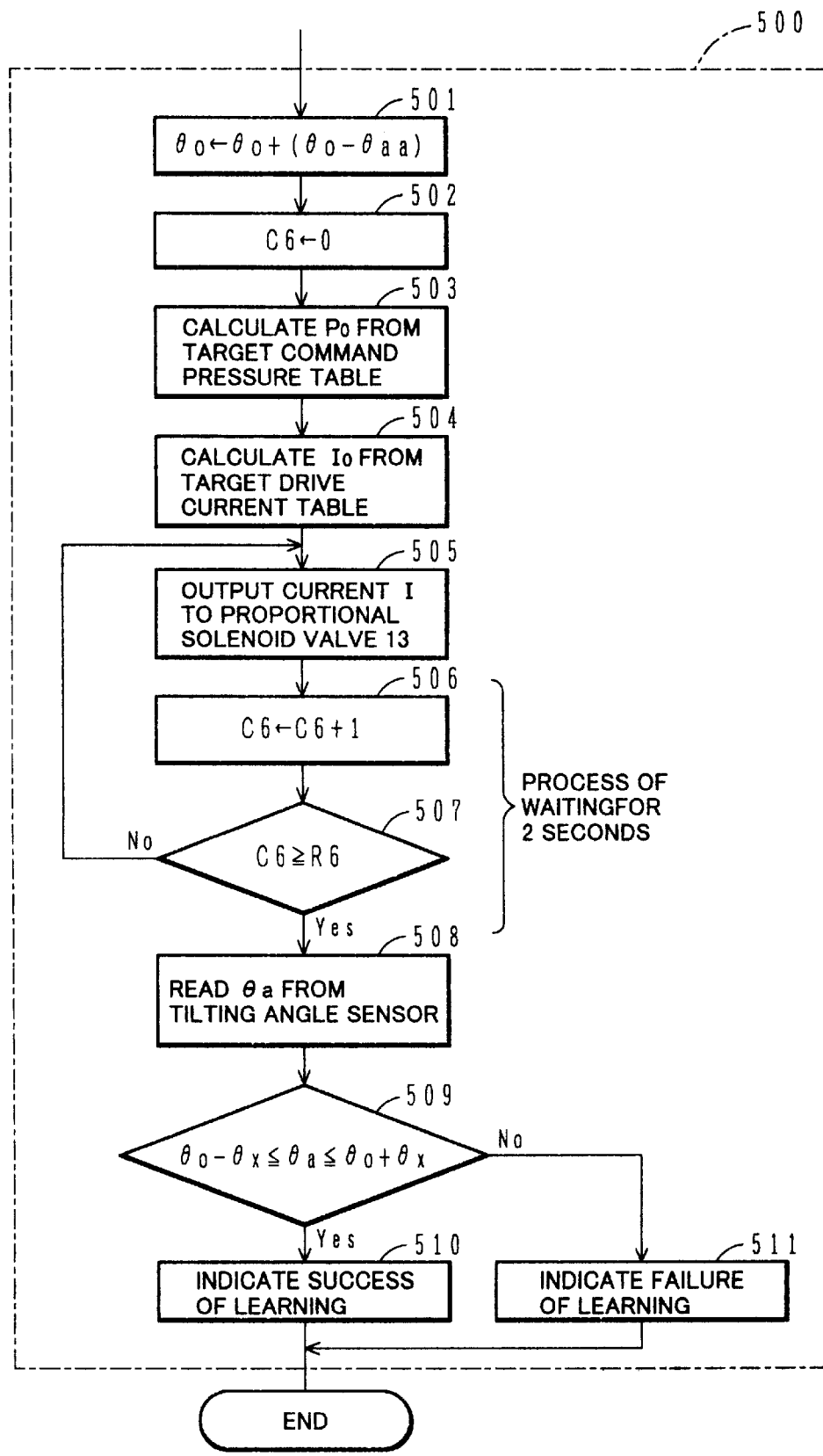
FIG. 14 is a flowchart showing details of a learning calculation value checking process in the procedures shown in FIG. 13.

Details of the learning calculation value checking process 500 are shown in a flowchart of FIG. 14. First, the controller sets a value which results from adding the correction value $\Delta\theta_0$ to the target pump tilting $\theta_0$ ($=\theta_{01}$), i.e., $\theta_0+(\theta_0-\theta_{aa})$, to the target pump tilting $\theta_0$ (step 501). Also, the controller puts zero (0) in a waiting time counter C6 (step 502) for setting a predetermined time, e.g., 2 seconds, during which it waits until the pump tilting is stabilized. Subsequently, the same processes as in the above steps 403 to 407 are executed (steps 503 to 507). If C6 is not less than 2 seconds, the controller reads an actual pump tilting $\theta_a$ detected by the tilting angle sensor 11 (step 508) and then determines whether the actual pump tilting $\theta_a$ is within an allowable tilting range of $\theta_0-\theta_x \leq \theta_a \leq \theta_0+\theta_x$ with respect to the target pump tilting $\theta_0$ (step 509). If the actual pump tilting is within the allowable tilting range, the success of learning is indicated (step 510), and if it is not within the allowable tilting range, the failure of learning is indicated (step 511). Such an indication is indicated by, for example, lighting on an LED (not shown) continuously after the controller enters the above-mentioned learning control flow, lighting off the LED upon the success of learning, and lighting on-and-off the LED upon the failure of learning.

Figure 15:
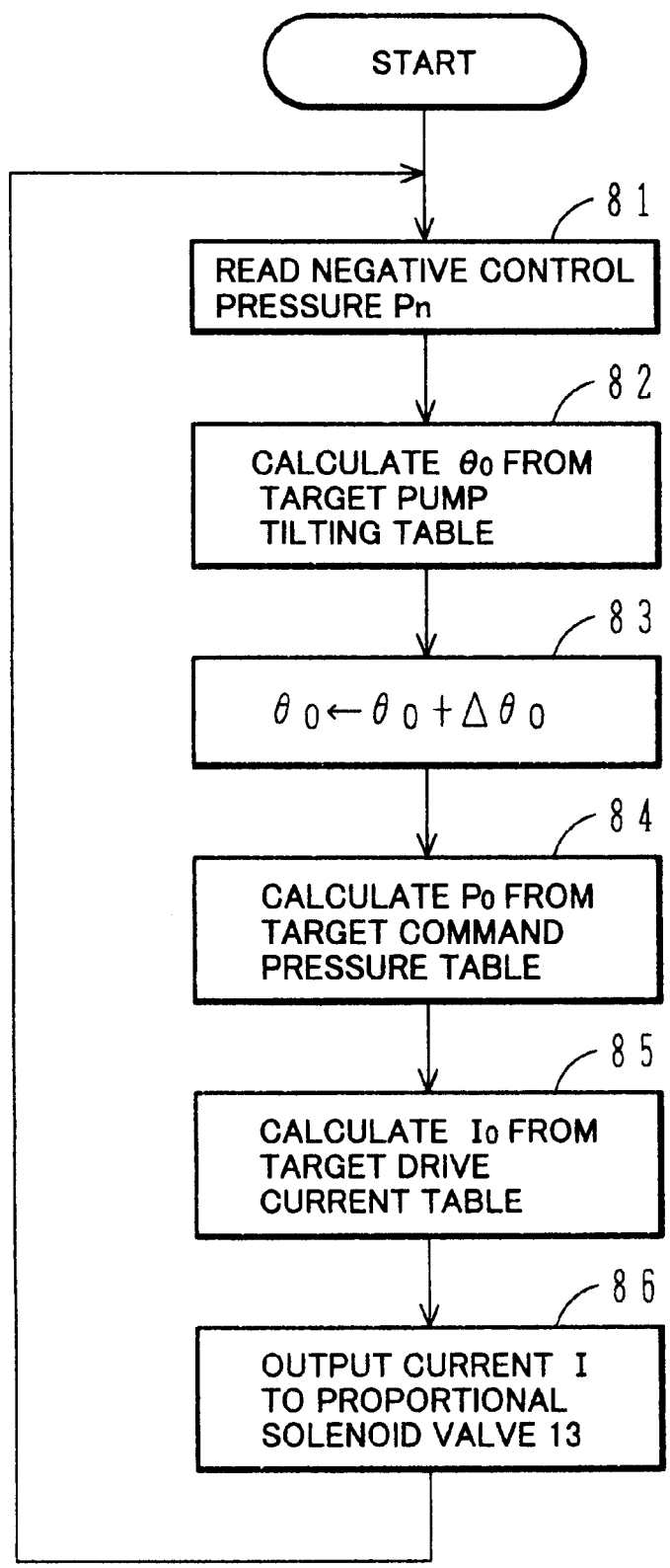
FIG. 15 is a flowchart showing processing procedures of a normal control mode in the procedures shown in FIG. 9.

The processing procedures of the normal control mode are shown in a flowchart of FIG. 15. First, the controller reads the negative control pressure Pn detected by the pressure sensor 10 (step 81). The negative control pressure detected at that time is assumed to be Pn3, for example. Subsequently, a target pump tilting $\theta_0$ ($=\theta_{03}$) corresponding to the negative control pressure Pn ($=$Pn3) at that time is determined based on the characteristic of the target pump tilting table shown in FIG. 5 (step 82). Then, the correction value $\Delta\theta_0$ stored in the EEPROM of the storage portion 12b is added to the target pump tilting $\theta_0$ ($=\theta_{03}$) to derive a corrected target pump tilting $\theta_0$ ($=\theta_{03c}$) (step 83). Then, a target command pressure $P_0$ ($=P_{03c}$) corresponding to the corrected target pump tilting $\theta_0$ ($=\theta_{03c}$) is calculated based on the characteristic of the target command pressure table shown in FIG. 6 (step 84). Further, a target drive current $I_0$ ($=I_{03c}$) corresponding to the target command pressure $P_0$ ($=P_{03c}$) is calculated based on the characteristic of the target drive current table shown in FIG. 7 (step 85). After that, a drive current I ($=I_{3c}$) corresponding to the target drive current $I_0$ ($=I_{03c}$) is output to the proportional solenoid valve 3 from the proportional solenoid valve driver portion 12c.

Upon the drive current $I_{3c}$ being output to the proportional solenoid valve 3, the proportional solenoid valve 3 outputs a command pressure $P_{3c}$ based on the input/output characteristic A shown in FIG. 2, and the regulator 2 moves the swash plate 1a of the hydraulic pump 1 so as to have an actual pump tilting $\theta_{3c}$ based on the input/output characteristic B shown in FIG. 3.

In the above steps 82 and 83, the target pump tilting $\theta_0$ ($=\theta_{03}$) derived from the negative control pressure Pn ($=$Pn3)

is not set to the target value as it is, but the value $\theta_0+\Delta\theta_0$ which results from adding the correction value $\Delta\theta_0$ to the target pump tilting $\theta_0$ (=$\theta_{03}$) is set to the target value $\theta_{03c}$. Here, as stated above, the correction value $\Delta\theta_0$ represents the respective deviations between the actual input/output characteristics A, B and the target input/output characteristics Ao, Bo of the proportional solenoid valve 3 and the regulator 2. Accordingly, setting the value $\theta_0+\Delta\theta_0$, which results from adding the correction value $\Delta\theta_0$ to the target pump tilting $\theta_0$ (=$\theta_{03}$), to the target value $\theta_{03c}$ implies that the error of the actual pump tilting, which would be caused if the drive current $I_3$ is output by using the target pump tilting $\theta_0$ (=$\theta_{03}$) as it is without any correction, is offset in advance. Also, controlling the proportional solenoid valve 3 and the regulator 2 with $\theta_0+\Delta\theta_0$ set to the target value ($\theta_{03c}$) is essentially equivalent to that the proportional solenoid valve 3 and the regulator 2 having the respective target characteristics shown in FIGS. 2 and 3 are controlled with the drive current $I_3$. In other words, the actual pump tilting $\theta_{3c}$ resulted from controlling the proportional solenoid valve 3 and the regulator 2 with $\theta_0+\Delta\theta_0$ set to the target value ($\theta_{03c}$) is the same as the actual pump tilting $\theta_3$ which results when a target command pressure $P_{03}$ is calculated from the target pump tilting $\theta_{03}$ based on the characteristic shown in FIG. 6, a target drive current $I_{03}$ is calculated from the target command pressure $P_{03}$ based on the characteristic shown in FIG. 7, a drive current $I_3$ corresponding to the target drive current $I_{03}$ is output to the proportional solenoid valve 3, a command pressure $P_3$ corresponding to the drive current $I_3$ is output based on the target characteristic Ao shown in FIG. 2, and the swash plate 1a of the hydraulic pump 1 is moved under the command pressure $P_3$ based on the target characteristic Bo shown in FIG. 3.

Likewise, when the negative control pressure Pn generated in the line 16 is other than Pn3, the actual pump tilting $\theta_c$ which results from correcting the target pump tilting $\theta_0$ by addition of the correction value $\Delta\theta_0$ is also the same as the actual pump tilting $\theta$ which results through the control based on the target characteristics shown in FIGS. 2 and 3 without correcting the target pump tilting $\theta_0$.

Figure 16:
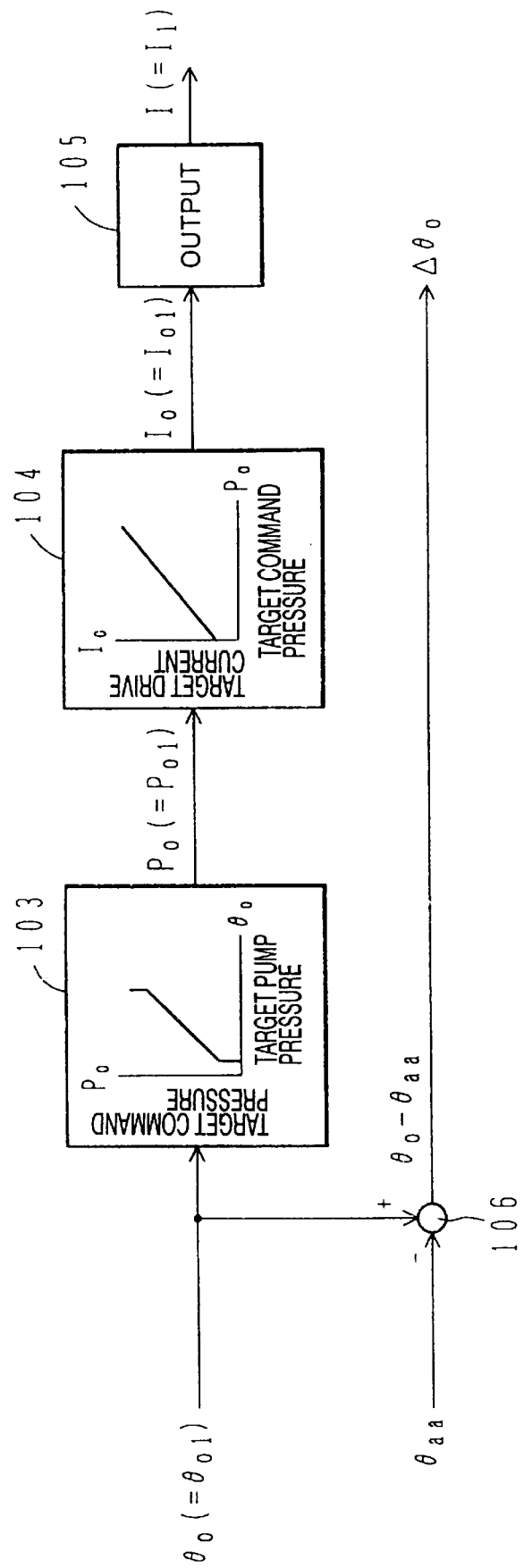
FIG. 16 is a functional block diagram showing an outline of the pump tilting learning calculation process 400, shown in FIG. 13, in the procedures of the learning control mode.

An outline of the pump tilting learning calculation process 400 in the learning control mode is shown in a functional block diagram of FIG. 16. In FIG. 16, a block 103 corresponds to the processing function of the step 403 in FIG. 13, a block 104 corresponds to the processing function of the step 404 in FIG. 13, and a block 105 corresponds to the processing function of the step 405 in FIG. 13. The averaged actual pump tilting $\theta_{aa}$ is subtracted from the target pump tilting $\theta_{01}$ in a subtracter 106 to obtain the difference therebetween, i.e., the correction value $\Delta\theta_0$.

Figure 17:
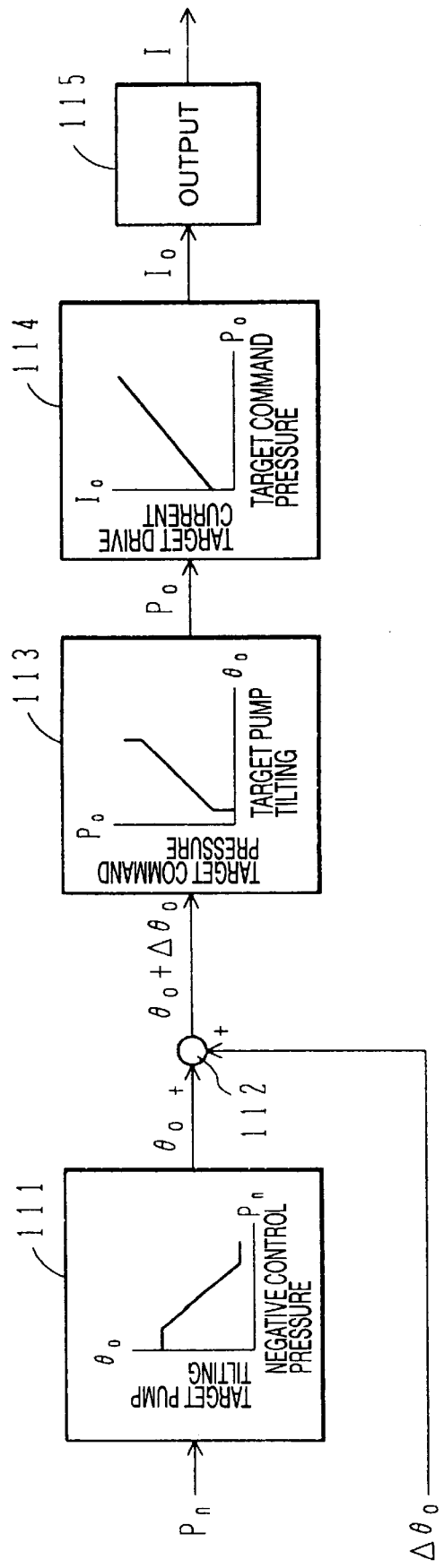
FIG. 17 is a functional block diagram showing an outline of the processing procedures of the normal control mode shown in FIG. 15.

An outline of the process in the normal control mode is shown in a functional block diagram of FIG. 17. In FIG. 17, a block 111 corresponds to the processing function of the step 82 in FIG. 15, an adder 112 corresponds to the processing function of the step 83 in FIG. 15, a block 113 corresponds to the processing function of the step 84 in FIG. 15, a block 114 corresponds to the processing function of the step 85 in FIG. 15, and a block 115 corresponds to the processing function of the step 86 in FIG. 15.

In this embodiment constructed as described above, when the operator turns on the mode switch 13, the learning control mode is set and the correction value $\Delta\theta_0$ is stored in the EEPROM of the storage portion 12b in the manner described above.

When the operator turns off the mode switch 13, the mode is switched to the normal control mode. Then, when the operator manipulates the control lever of the control lever unit 17 for carrying out intended work, a negative control pressure Pn corresponding to the input amount by which the control lever is manipulated generates in the line 16, the generated negative control pressure Pn being detected by the pressure sensor 10 and sent to the processing portion 12a of the controller 12. In the processing portion 12a, as described above, a target pump tilting $\theta_0$ corresponding to the negative control pressure Pn is determined and then a value resulted from adding the correction value $\Delta\theta_0$ to the target pump tilting $\theta_{01}$ is set to the target value $\theta_{03c}$, thereby compensating for the error which would be otherwise caused due to the actual input/output characteristics A, B of the proportional solenoid valve 3 and the regulator 2. In accordance with the corrected target value, the proportional solenoid valve 3 and the regulator 2 are controlled.

With this embodiment, therefore, even when the characteristics of the proportional solenoid valve 3 and the regulator 2 are varied one by one, the same pump tilting as the actual pump tilting $\theta$ (=the target pump tilting $\theta_0$) which results through the control based on the target characteristics shown in FIGS. 2 and 3 can be always achieved. Accordingly, the actual pump tilting can be controlled to be held in agreement with the target pump tilting and variations in the actual pump tilting can be reduced. In the operation in which a hydraulic working machine is required to precisely follow the operator's manipulation, particularly, such an operation as leveling or front positioning effected by a hydraulic excavator, it is possible to improve the fine operability and a feeling in the operation, and increase the working efficiency.

Note that, in the normal operation, the actual pump tilting could be also controlled to be held in agreement with the target pump tilting by using the so-called feedback control in which the tilting angle of the hydraulic pump 1 detected by the tilting angle sensor 11 is fed back to perform control based on a difference between the fed-back data and the target pump tilting. However, the feedback control has the problem that there occurs a response delay and, if the tilting angle sensor 11 should fail, the control is no longer able to continue. In the present invention, since the normal control mode is performed not under feedback control, but open loop control without resorting to the value detected by the tilting angle sensor 11, there occurs no response delay and, even if the tilting angle sensor 11 should fail, the working machine is able to continue the normal operation.

Also, with this embodiment, since one of the learning control mode and the normal control mode is selected by the operator manipulating the mode switch 13, the learning control mode can be selected at the discretion of the operator only when it is required.

Further, since part of the memory included in the storage portion 12b in which the correction value is stored is a non-volatile memory, the value once stored in the memory can be kept even after the power supplied to the controller 12 is cut off, and there is no need of making the learning control frequently.

Figure 18:
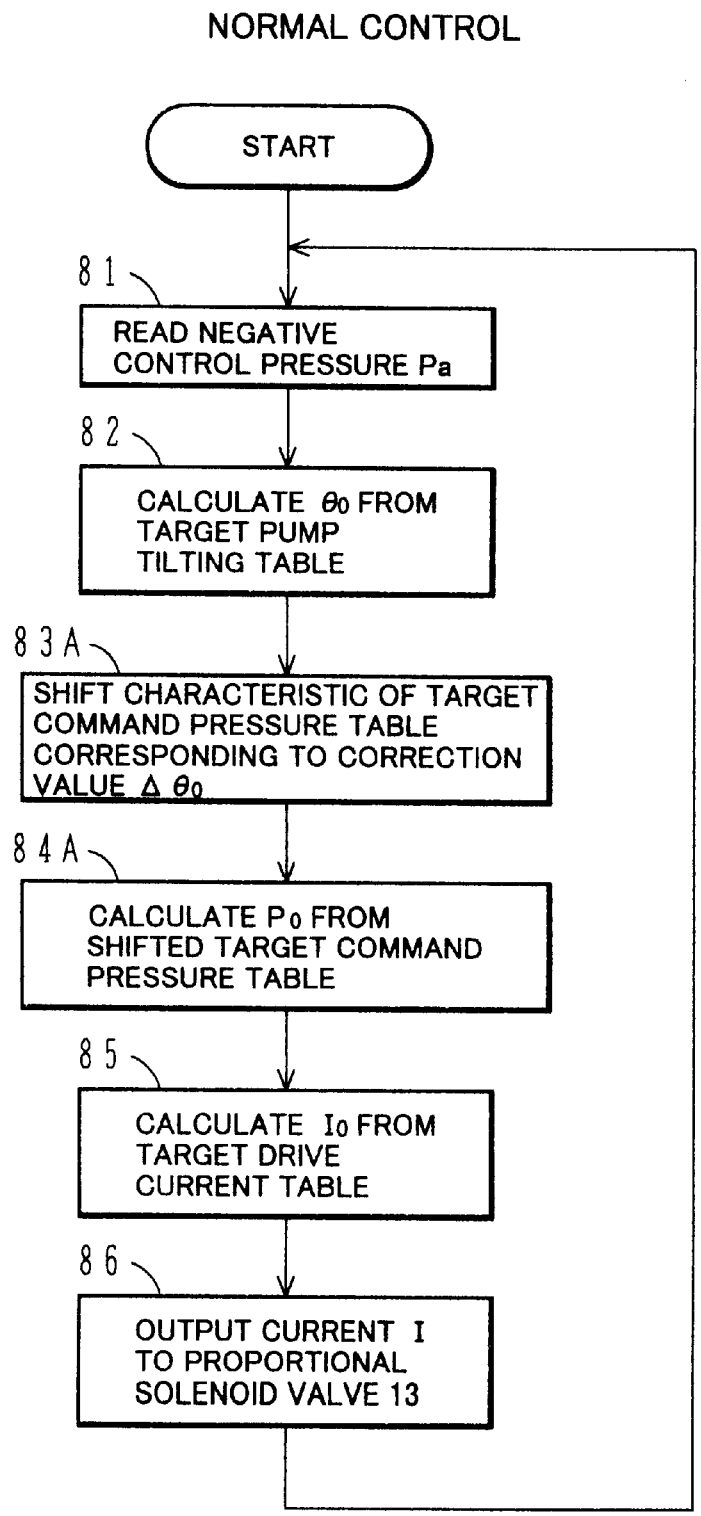
FIG. 18 is a flowchart showing processing procedures of a normal control mode in a hydraulic pump control system according to a second embodiment of the present invention.
Figure 19:
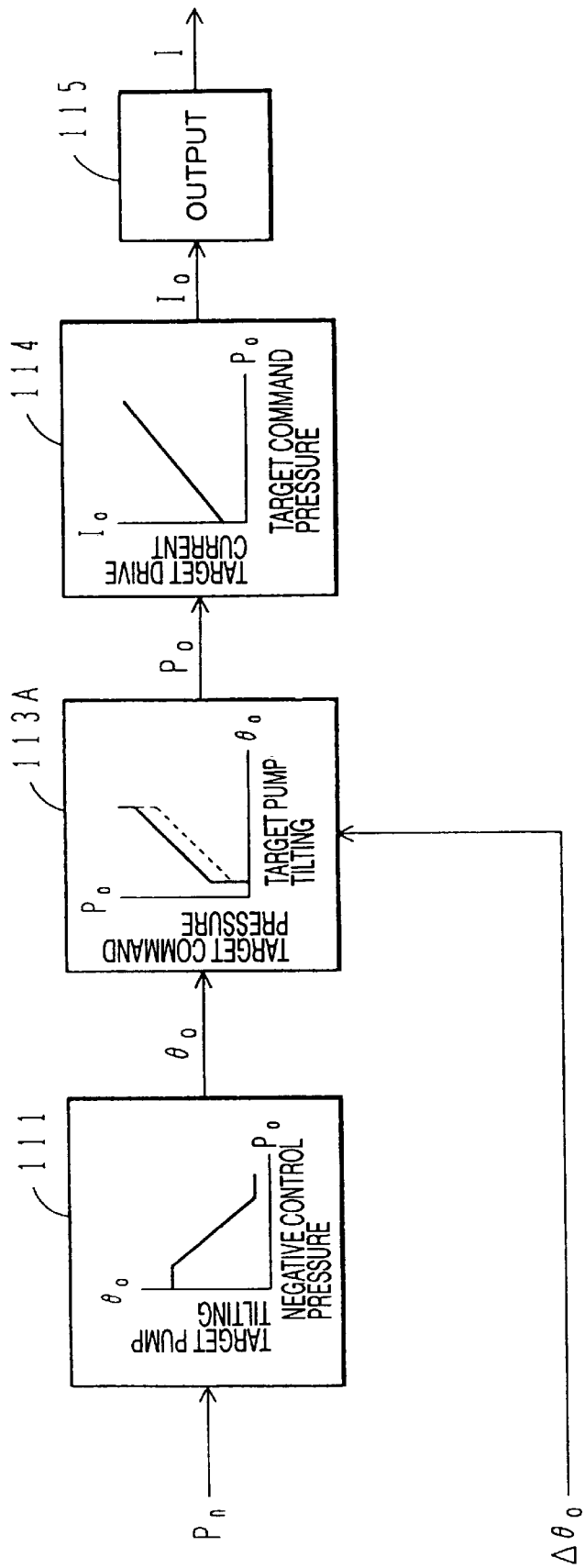
FIG. 19 is a functional block diagram showing an outline of the processing procedures shown in FIG. 18.

A second embodiment of the present invention will be described with reference to FIGS. 18 and 19. In this embodiment, rather than adding the correction value $\Delta\theta$ to the target pump tilting $\theta_0$, the characteristic of the target command pressure table is shifted by an amount corresponding to the correction value $\Delta\theta_0$ in the normal control mode. In FIGS. 18 and 19, the same steps and blocks as shown in FIGS. 15 and 17 are denoted by the same reference numerals and will not be described below.

Referring to FIG. 18, the normal control mode process in this embodiment is the same as in the first embodiment except for steps 83A and 84A. In the step 83A, the controller reads the correction value $\Delta\theta_0$ stored in the EEPROM of the storage portion 12b and shifts the characteristic of the target command pressure table shown in FIG. 6 by an amount corresponding to the correction value $\Delta\theta_0$. Then, in the step 84A, the controller calculates a target command pressure $P_0$ corresponding to the target pump tilting $\theta_0$ based on the shifted characteristic of the target command pressure table.

In FIG. 19, a block 113A corresponds to the processing function of the step 3A. In the block 113A, a broken line represents the characteristic of the target command pressure table before the shift and a solid line represents the characteristic of the target command pressure table after having been shifted by an amount corresponding to the correction value $\Delta\theta_0$.

This embodiment can also reduce variations in the actual pump tilting $\theta$ with respect to the target pump tilting $\theta_0$ as with the first embodiment.

Figure 20:
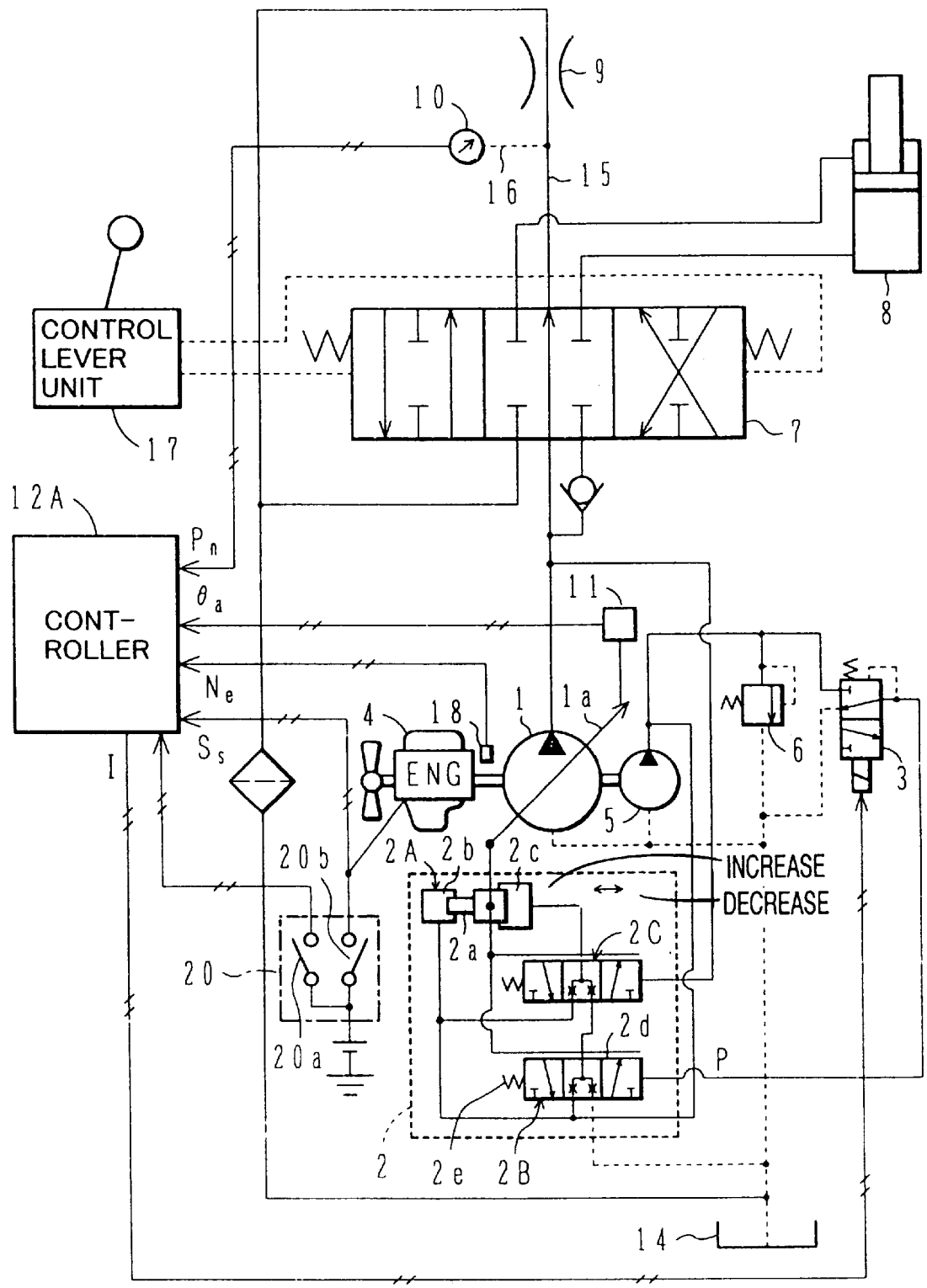
FIG. 20 is a diagram of a hydraulic circuit including a hydraulic pump control system according to a third embodiment of the present invention.
Figure 21:
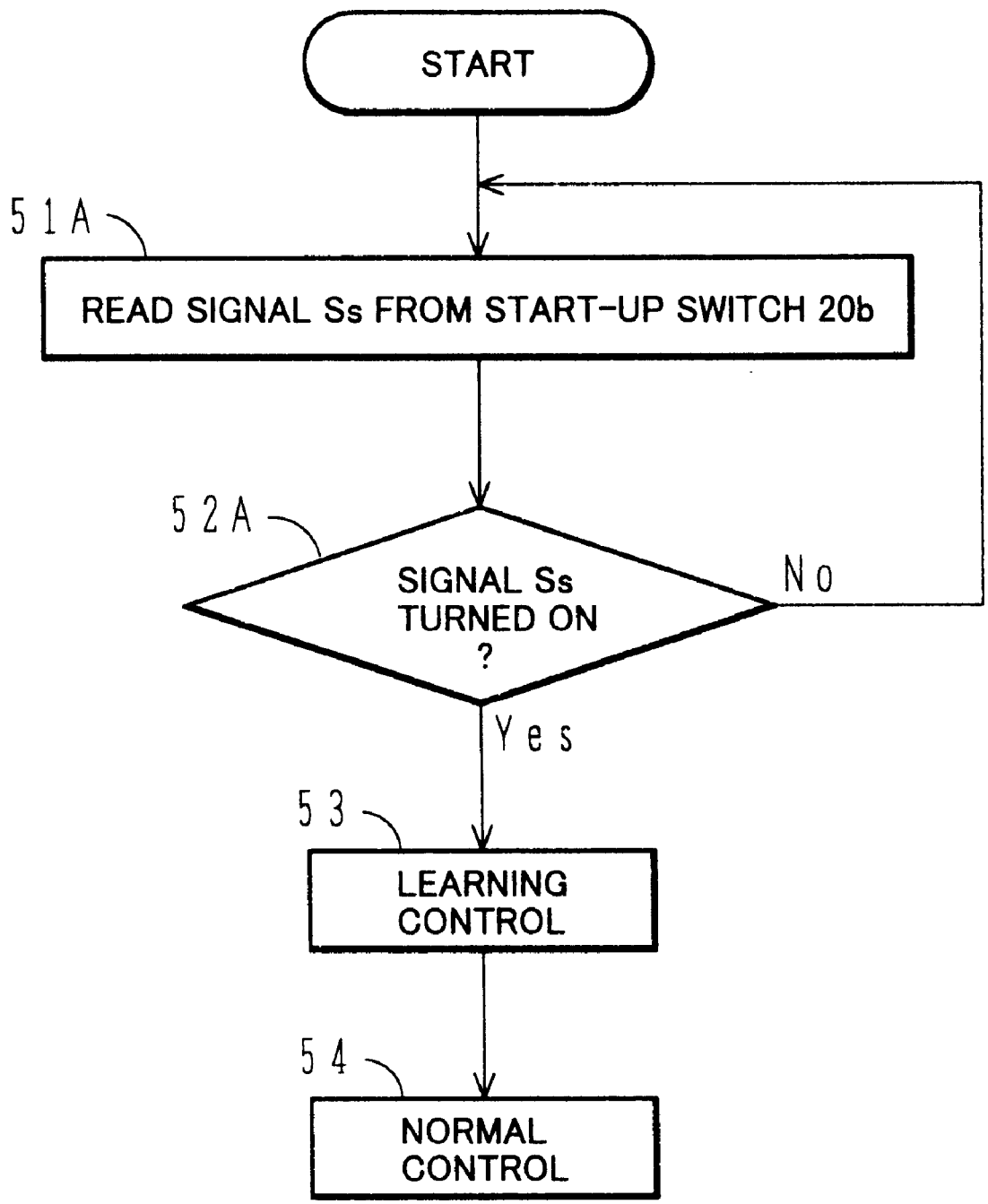
FIG. 21 is a flowchart showing general processing procedures of a controller shown in FIG. 20.

A third embodiment of the present invention will be described with reference to FIGS. 20 and 21. In this embodiment, the mode switch 13 is not provided and the learning control mode is executed by using a signal from the start-up switch 20b for the engine 4 of the key switch 20. In FIGS. 20 and 21, the same members and steps as shown in FIGS. 1 and 9 are denoted by the same reference numerals and will not be described below.

Referring to FIG. 20, a controller 12A receives a signal Ss from the start-up switch 20b of the key switch 20 (step 51A), determines whether the signal Ss from the start-up switch 20b is turned on or not (step 52A). If the signal Ss is determined being on, the controller executes a process of the learning control mode (step 53). When the process of the learning control mode is ended, the mode is switched to the normal control mode (step 54). This embodiment is advantageous in that it is not required for the operator to make specific manipulation to instruct selection of the control mode, and the operation necessary for starting the learning control is simplified.

A fourth embodiment of the present invention will be described with reference to FIGS. 22 through 30. While the target pump tilting is corrected in the above embodiments on an assumption that the input/output characteristics of the proportional solenoid valve and the regulator have the same gradients as the target input/output characteristics, the target pump tilting is corrected in this embodiment, taking into account the case where the characteristics of the proportional solenoid valve and the regulator have gradients different from the gradients of the target characteristics. Because the system configuration of this embodiment that of the first embodiment, the following description will be made by using the reference numerals shown in FIG. 1 with the system configuration not illustrated in the drawings.

Figure 22:
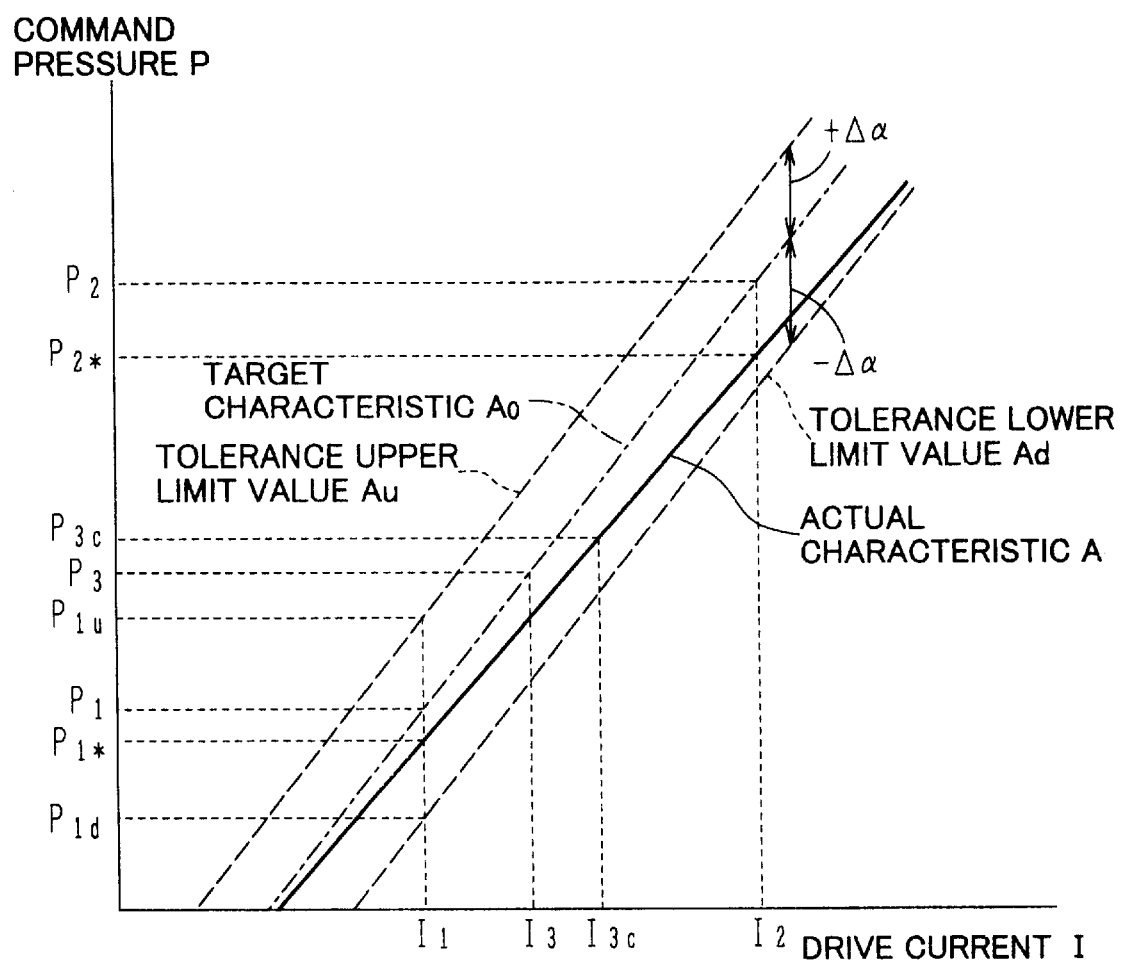
FIG. 22 is a graph showing a characteristic (drive current—command pressure) of a proportional solenoid used in a hydraulic pump control system according to a fourth embodiment of the present invention.
Figure 23:
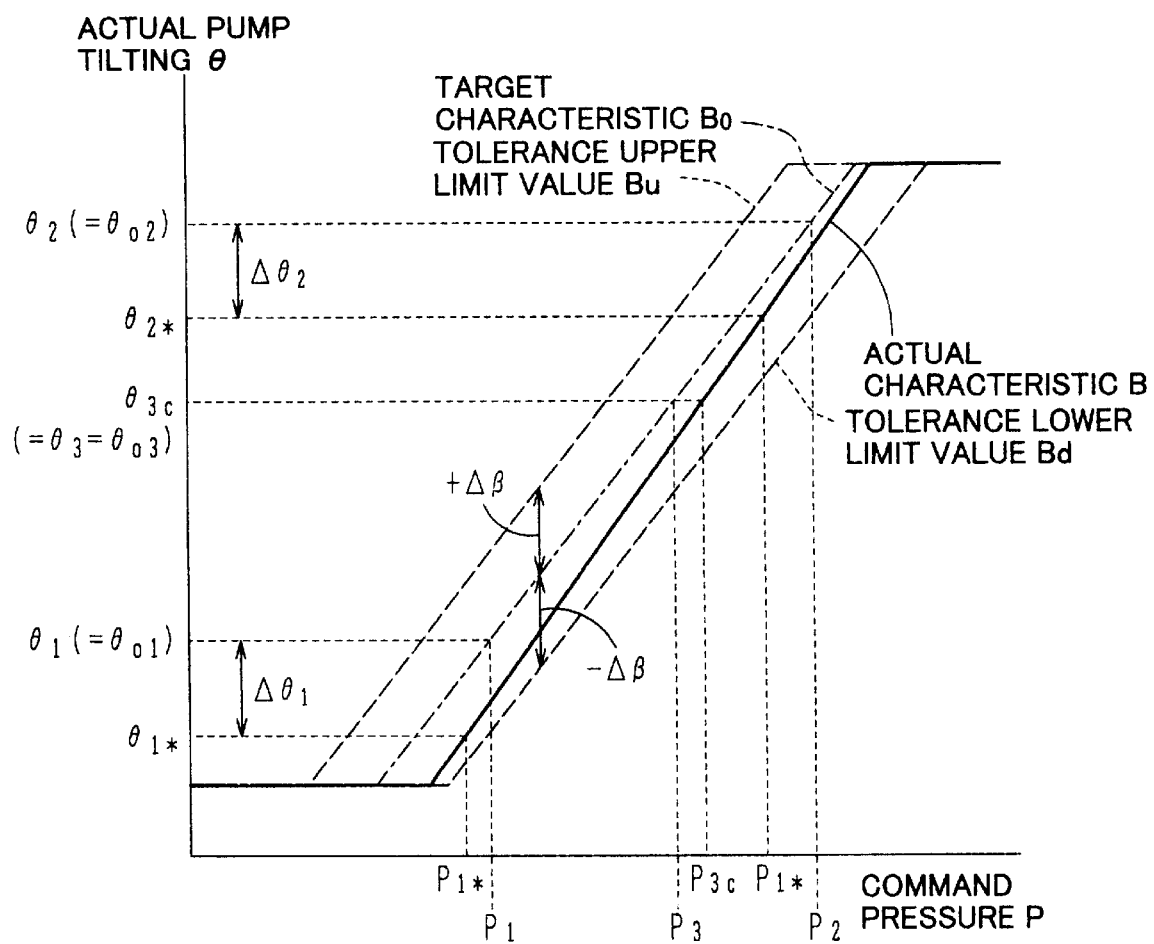
FIG. 23 is a graph showing a characteristic (command pressure—actual pump tilting) of a regulator used in the hydraulic pump control system of the fourth embodiment.

FIG. 22 shows an input/output characteristic of the proportional solenoid valve 3 supposed in this embodiment. An actual characteristic A varies for each of individual proportional solenoid valves within a tolerance of $\pm\Delta\alpha$ relative to a target characteristic Ao, and has the same gradient as the target characteristic Ao in some cases and a gradient different therefrom in other cases. FIG. 23 shows an input/output characteristic of the regulator 2 supposed in this embodiment. An actual characteristic B also varies for each of individual regulators within a tolerance of $\pm\Delta\beta$ relative to a target characteristic Bo, and has the same gradient as the target characteristic Bo in some cases and a gradient different therefrom in other cases. In view of the above, this embodiment is designed to determine a difference between the target pump tilting and the actual pump tilting in at least two points through the learning calculation process in the learning control mode, determine a correction formula from the differences determined in the two points for estimating respective deviations between the actual input/output characteristics A, B and the target input/output characteristics Ao, Bo of the proportional solenoid valve 3 and the regulator 2, and determine a correction value in the normal control mode by using the correction formula, thereby correcting the target pump tilting.

In this embodiment, the general processing procedures of the controller 12 are the same as in the first embodiment shown in FIG. 9. Thus, the learning control mode or the normal control mode is selectively started depending on whether the mode switch Sm is on or off.

Figure 24:
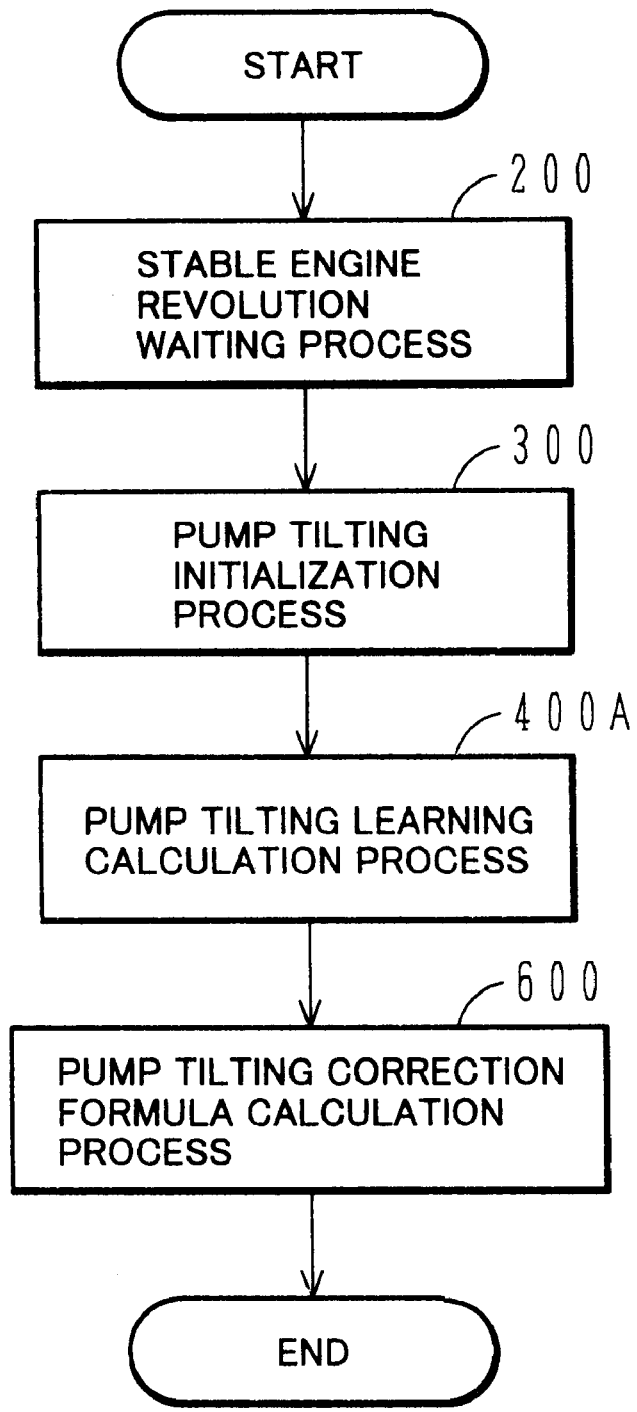
FIG. 24 is a flowchart showing processing procedures of a learning control mode according to the fourth embodiment of the present invention.

The general processing procedures of the learning control mode are shown in a flowchart of FIG. 24.

As a first step of the learning control mode process, the controller 12 initially executes a stable engine revolution waiting process 200 and then a pump tilting initialization process 300. The procedures of these two processes are the same as shown in FIGS. 11 and 12 relating to the first embodiment. After having been thus prepared, the controller executes a pump tilting learning calculation process 400A and thereafter a pump tilting correction formula calculation process 600.

Figure 25:
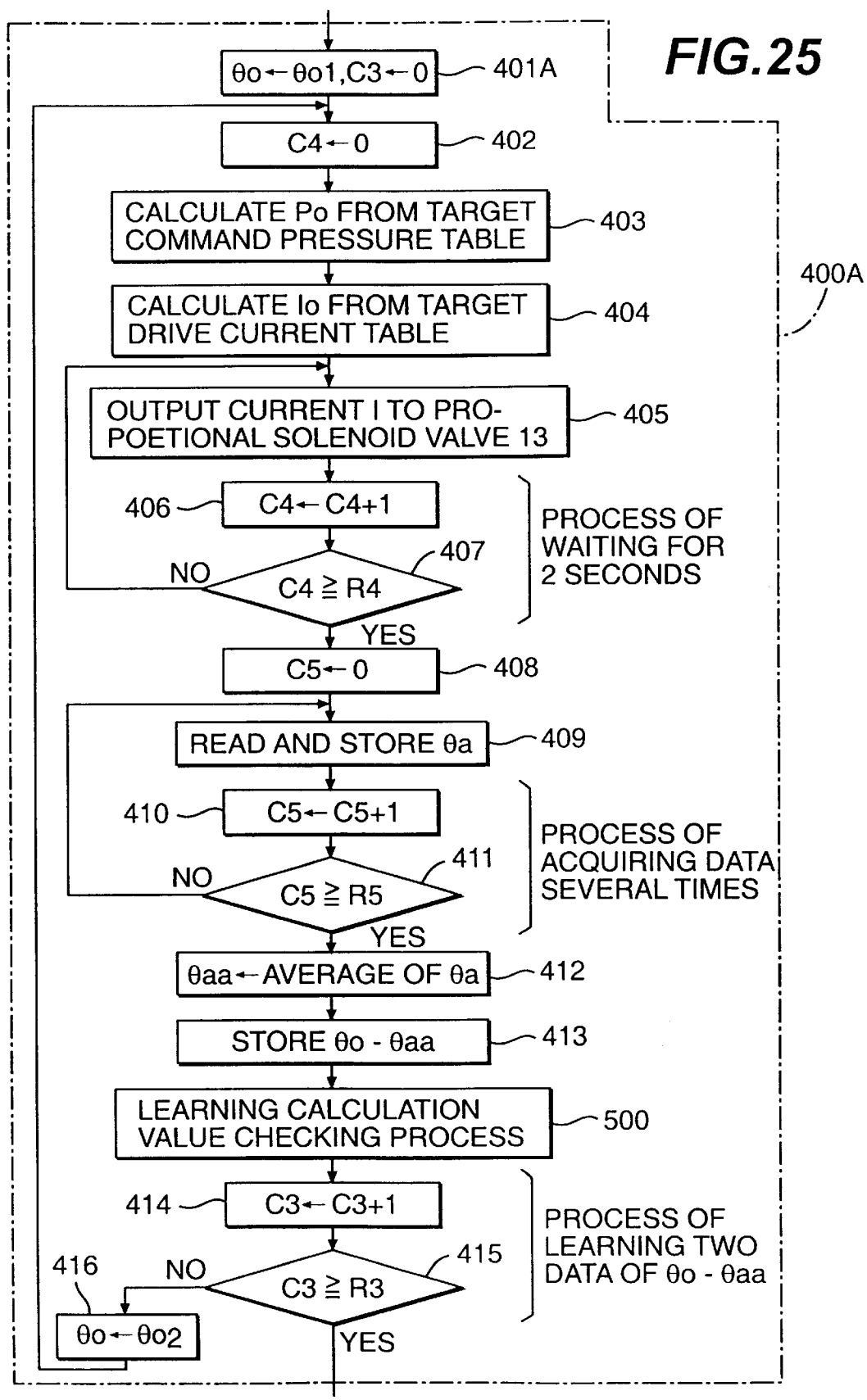
FIG. 25 is a flowchart showing details of a pump tilting learning calculation process in the procedures shown in FIG. 24.
Figure 26:
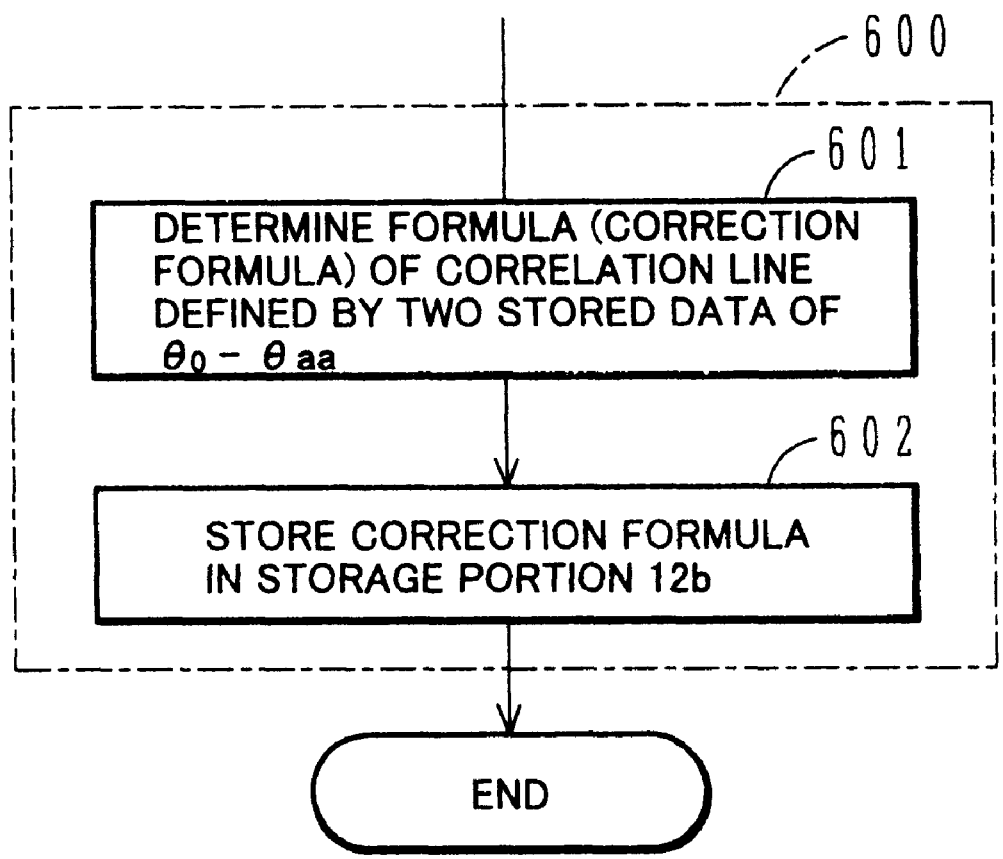
FIG. 26 is a flowchart showing details of a pump tilting correction formula calculation process in the procedures shown in FIG. 24.
Figure 27:
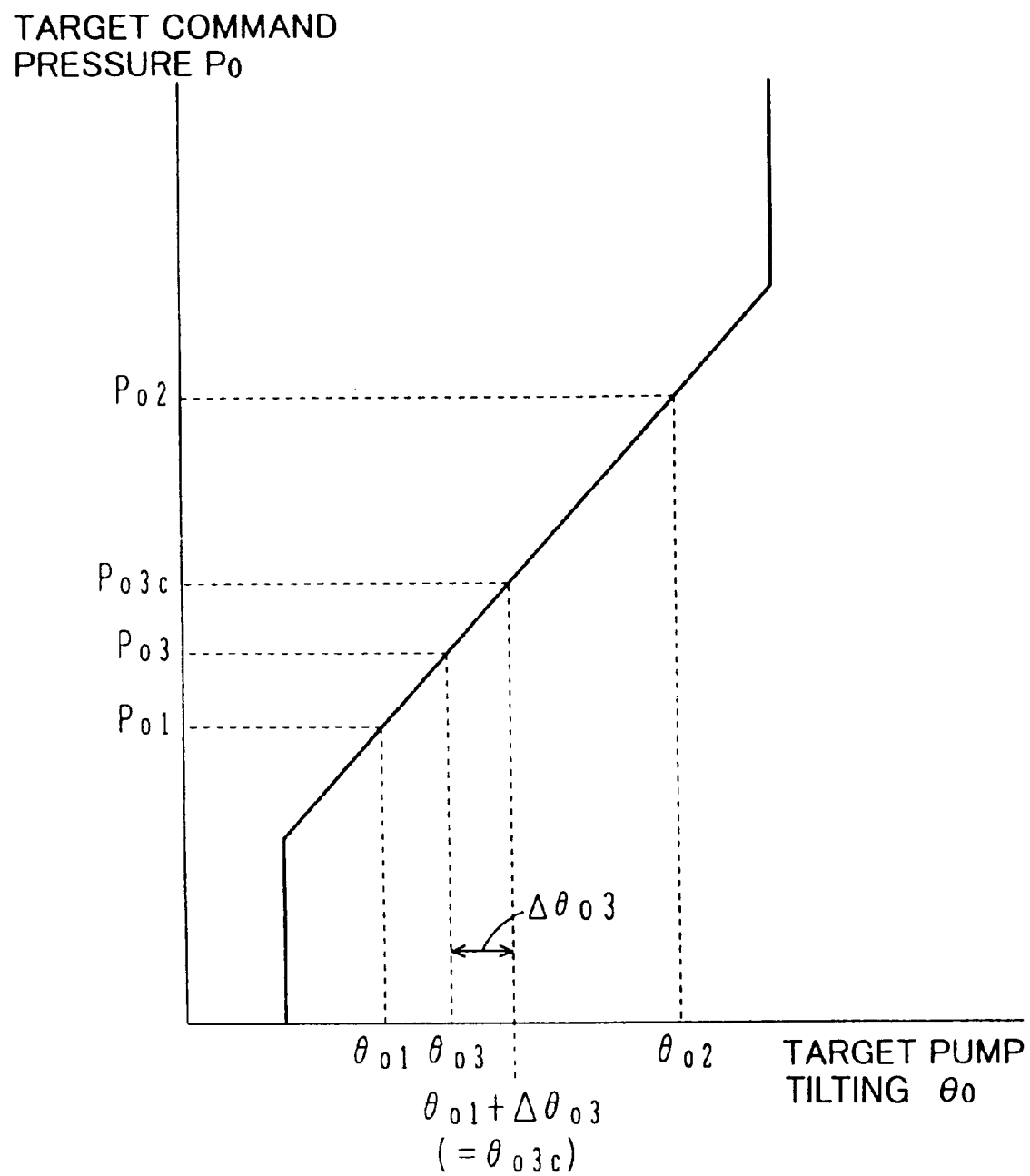
FIG. 27 is a graph showing a characteristic (target pump tilting—target command pressure) of a target command pressure table stored in a controller.
Figure 28:
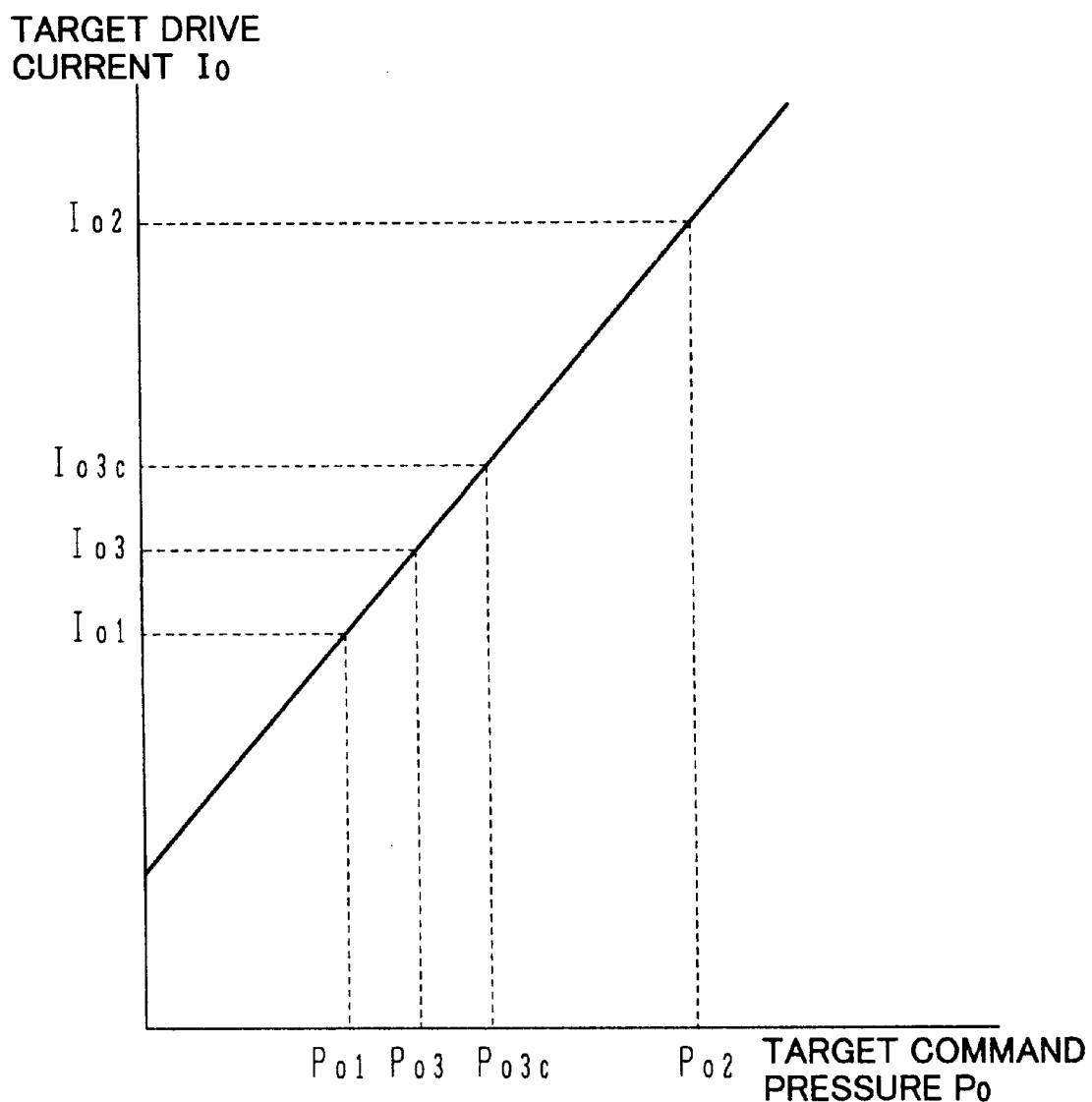
FIG. 28 is a graph showing a characteristic (target command pressure—target drive current) of a target drive current table stored in the controller.

Details of the pump tilting learning calculation process 400A and details of the pump tilting correction formula calculation process 600 are shown respectively in flowcharts of FIGS. 25 and 26.

In the pump tilting learning calculation process 400A, the controller first sets a predetermined tilting $\theta_{01}$ to the target pump tilting $\theta_0$ and puts zero (0) in a number-of-execution-cycles counter C3 for setting the number of times R3, i.e., 2 in this embodiment, that the following steps from 402 to 416 are repeated (step 401A). Also, because a certain time is required until the output of the proportional solenoid valve 3 is transmitted from the regulator 2 to the swash plate 1a and the target pump tilting is established, the controller puts zero (0) in a waiting time counter C4 (step 402) for setting a predetermined time, e.g., 2 seconds. Subsequently, a target command pressure $P_0$ (=$P_{01}$) corresponding to the target pump tilting $\theta_0$ (set to $\theta_{01}$) is calculated based on the characteristic of the target command pressure table shown in FIG. 27 (step 403). Then, a target drive current $I_0$ (=$I_{01}$) corresponding to the target command pressure $P_0$ (=$P_{01}$) is calculated based on the characteristic of the target drive current table shown in FIG. 28 (step 404). After that, a drive current I (=$I_1$) corresponding to the target drive current $I_{01}$ is output to the proportional solenoid valve 3 from the proportional solenoid valve driver portion 12c of the controller 12 (step 405). After adding one (1) to the waiting time counter C4 (step 406), the controller determines whether C4 is not less than a set value R4, i.e., 2 seconds in this embodiment (step 407). Unless C4 is not less than 2 seconds, the controller returns to the step 405 of outputting the drive current I (=$I_1$) corresponding to the target drive current $I_{01}$ to the proportional solenoid valve 3, thereby repeating the above procedures until C4 becomes not less than 2 seconds.

Upon the elapse of a time not less than 2 seconds after the output of the drive current I (=$I_1$), the controller puts zero (0) in a number-of-reading-cycles counter C5 (step 408) for setting the number of times that it reads the detected value. Then, the controller reads an actual pump tilting $\theta_a$ (=$\theta_{1*}$;

see FIG. 23) detected by the tilting angle sensor 11 and stores it in the RAM of the storage portion 12b (step 409). After adding one (1) to the number-of-reading-cycles counter C5 (step 410), the controller determines whether C5 is not less than a set number of times R5, i.e., 10 in this embodiment (step 411). Unless C5 is not less than the number of times R5, the controller returns to the step 409 of reading the actual pump tilting $\theta_a$ (=$\theta_{1*}$) detected by the tilting angle sensor 11, thereby repeating the above procedures until C5 becomes not less than the number of times R5. Accordingly, data of the actual pump tilting $\theta_a$ in number R5 (10) are stored in the RAM of the storage portion 12b.

Subsequently, taking into account variations in the actual pump tilting $\theta_a$ (=$\theta_{1*}$), an averaging process of dividing the stored data of $\theta_a$ in number R5 by R5 is executed to calculate an average actual pump tilting $\theta_{aa}$ (step 412). Then, a difference $\Delta\theta_1 = \theta_0 - \theta_{aa}$ (=$\theta_{01} - \theta_{1*}$) between the target pump tilting $\theta_0$ (=$\theta_{01}$) and the average actual pump tilting $\theta_{aa}$ is determined and stored in the EEPROM of the storage portion 12b (step 413).

Here, if the characteristics of the proportional solenoid valve 3 and the regulator 2 are respectively in agreement with the target characteristics Ao, Bo shown in FIGS. 22 and 23, the proportional solenoid valve 3 should output the command pressure $P_1$ corresponding to the drive current $I_1$ and the regulator 2 should provide the pump tilting $\theta_1$ (=$\theta_{01}$) corresponding to the command pressure $P_1$, when the drive current $I_1$ corresponding to the target pump tilting $\theta_{01}$ is output to the proportional solenoid valve 3 through the steps 402 to 405. In practice, however, the actual characteristics of the proportional solenoid valve 3 and the regulator 2 are varied as indicated by A, B shown in FIGS. 22 and 23. Therefore, when the drive current $I_1$ is output to the proportional solenoid valve 3, the proportional solenoid valve 3 outputs a command pressure $P_{1*}$ corresponding to the drive current $I_1$ and the regulator 2 provides an actual pump tilting $\theta_{1*}$ ($\theta_{aa}$) corresponding to the command pressure $P_{1*}$. Thus, $\Delta\theta_1 = \theta_0 - \theta_{aa}$ (=$\theta_{01} - \theta_{1*}$) determined in the step 413 corresponds to the difference between the pump tilting $\theta_1$ based on the target characteristic resulted when the target pump tilting $\theta_0$ is $\theta_{01}$ and the actual pump tilting $\theta_{1*}$.

After storing the difference $\Delta\theta_1 = (\theta_0 - \theta_{aa})$ in the RAM of the storage portion 12b, the controller executes a learning calculation value checking process 500 for checking whether that difference is a properly calculated value. The learning calculation value checking process 500 is the same as in the first embodiment shown in FIG. 14.

If the success of learning is determined in the process 500, the controller adds one (1) to the number-of-execution-cycles counter C3 (step 414) and then determines whether C3 is not less than the set number of times R3 (2) (step 415). Unless C3 is not less than the number of times R3 (2), the controller sets a predetermined tilting $\theta_{02}$ different from $\theta_{01}$ to the target pump tilting $\theta_0$ and then returns to the step 402 of putting zero (0) in the waiting time counter C4, thereby repeating the above steps 403 to 415. Through these steps, a difference $\Delta\theta_2 = \theta_0 - \theta_{aa}$ (=$\theta_{02} - \theta_{2*}$) between the target pump tilting $\theta_0$ (=$\theta_{02}$) and the average actual pump tilting $\theta_{aa}$ is determined and stored in the EEPROM of the storage portion 12b (step 413). If C3 becomes not less than the number of times R3 (2), the control flow goes to the pump tilting correction formula calculation process 600 shown in FIG. 26.

Figure 29:
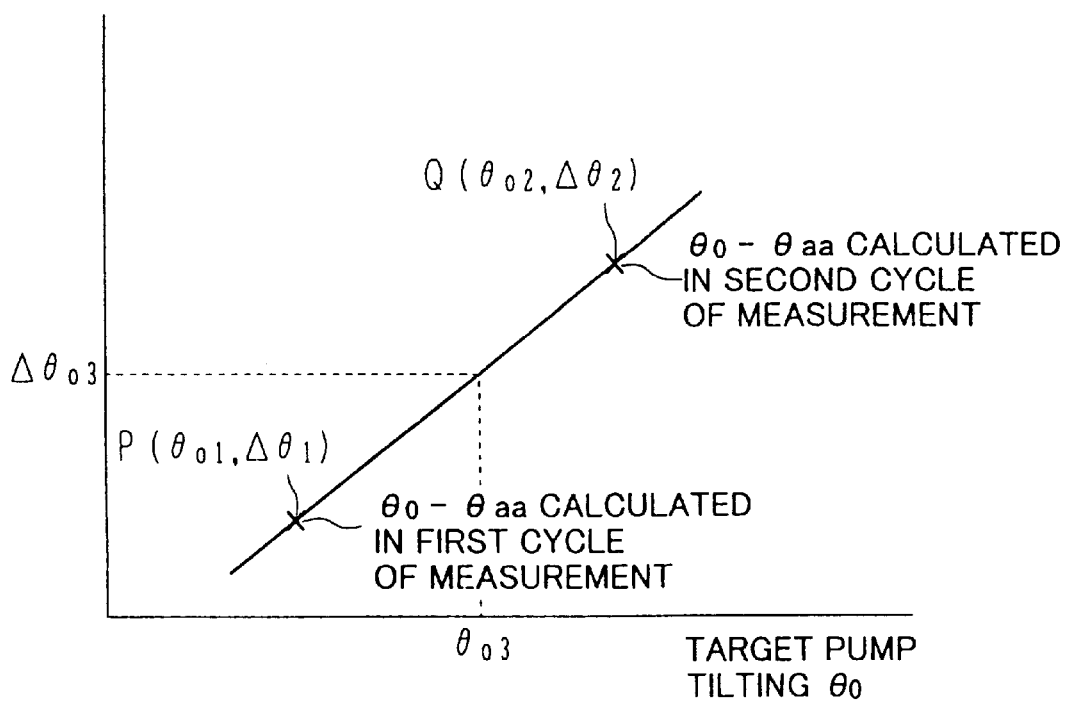
FIG. 29 is a graph showing a correction formula.

In the pump tilting correction formula calculation process 600, from two data of the difference $\theta_0 - \theta_{aa}$ between two values of the target pump tilting $\theta_{01}$, $\theta_{02}$ and the average actual pump tilting in two points stored in the storage portion 12b, i.e., $\Delta\theta_1$ and $\Delta\theta_2$, an equation of the first order representing a straight line P–Q on the XY-coordinate system (in which the X-axis indicates the target pump tilting $\theta_0$ and the Y-axis indicates the difference $\theta_0 - \theta_{aa}$ between the target pump tilting and the average actual pump tilting) as shown in FIG. 29 is determined below (step 601):

$$Y = ((\Delta\theta_2 - \Delta\theta_1)/(\theta_{02} - \theta_{01}))X + C$$

This is simplified to:

$$Y = KX + C$$

After that, the equation of first order is stored as a correction formula in the EEPROM of the storage portion 12b. This process is practically performed by storing K and C, rather than storing the equation of first order as it is.

Here, a Y-coordinate value $\theta_0 - \theta_{aa}$ of the calculation formula $Y = KX + C$ determined in the step 601 corresponds to the difference between the pump tilting $\theta_1$ based on the target characteristic and the actual pump tilting $\theta_{aa}$ and, from that calculation formula, respective deviations between the actual input/output characteristics A, B and the target input/output characteristics Ao, Bo of the proportional solenoid valve 3 and the regulator 2 can be estimated. Specifically, in the case where the actual input/output characteristics A, B of the proportional solenoid valve 3 and the regulator 2 are deviated from the target input/output characteristics Ao, Bo with the characteristic lines having different gradients from each other like this embodiment, the deviations of the input/output characteristics of the proportional solenoid valve 3 and the regulator 2 can be precisely expressed by using the calculation formula $Y = KX + C$. In other words, by estimating the deviations between the actual input/output characteristics A, B and the target input/output characteristics Ao, Bo based on the calculation formula $Y = KX + C$, calculating a correction value to offset the deviations depending on the target value with the calculation formula $Y = KX + C$ used as a correction formula, and adding it to the target pump tilting $\theta_0$, it is possible to obtain the pump tilting $\theta_1$ in accordance with the target characteristics free from variations (as described later in more detail).

Figure 30:
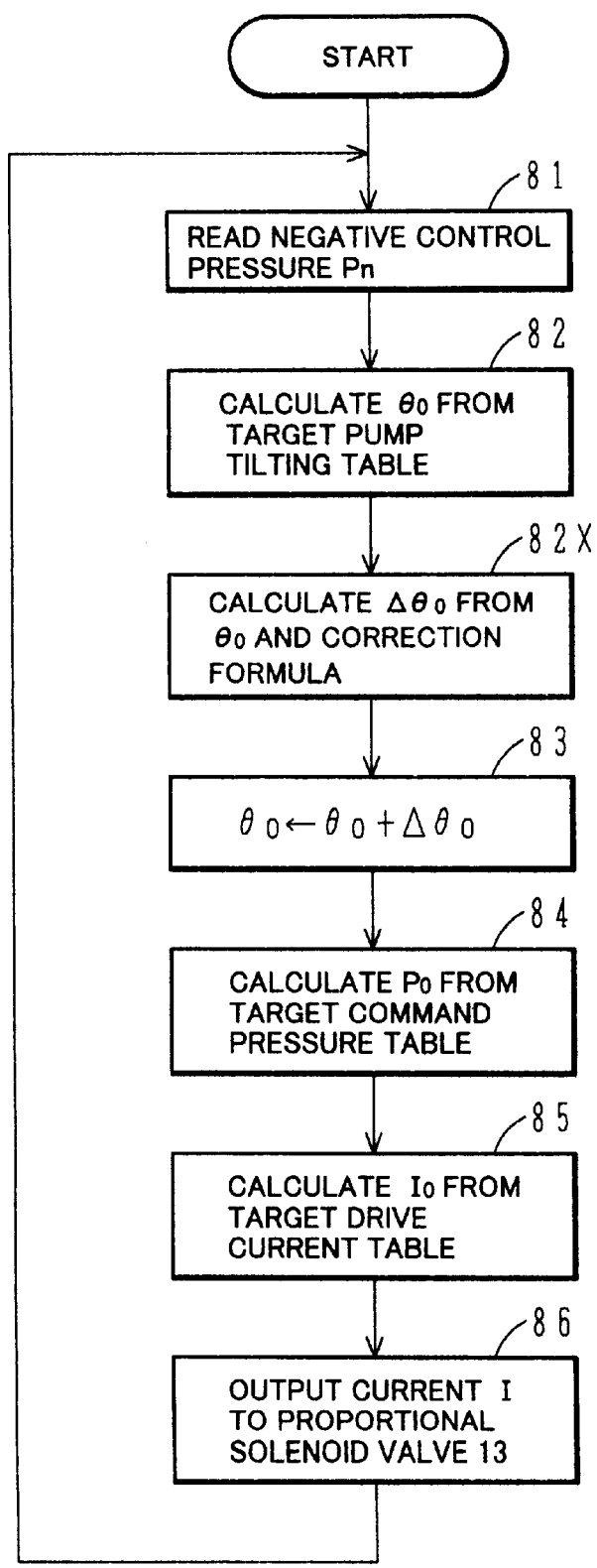
FIG. 30 is a flowchart showing processing procedures of a normal control mode according to the fourth embodiment of the present invention.

The processing procedures of the normal control mode are shown in a flowchart of FIG. 30. First, the controller reads the negative control pressure Pn detected by the pressure sensor 10 (step 81). The negative control pressure detected at that time is assumed to be Pn3, for example. Subsequently, a target pump tilting $\theta_0$ (=$\theta_{03}$) corresponding to the negative control pressure Pn (=Pn3) at that time is determined based on the characteristic of the target pump tilting table (see FIG. 5) (step 82). Then, a tilting correction value $\Delta\theta_0$ (=$\Delta\theta_{03}$) is calculated from the aforesaid calculation formula (Y=KX+C) stored in the EEPROM of the storage portion 12b (see FIG. 29) (step 82X), and the calculated correction value $\Delta\theta_0$ (=$\Delta\theta_{03}$) is added to the target pump tilting $\theta_0$ (=$\theta_{03}$) to derive a corrected target pump tilting $\theta_0$ (=$\theta_{03c}$) (step 83). Then, a target command pressure $P_0$ (=$P_{03c}$) corresponding to the corrected target pump tilting $\theta_0$ (=$\theta_{03c}$) is calculated based on the characteristic of the target command pressure table shown in FIG. 27 (step 84). Further, a target drive current $I_0$ (=$I_{03c}$) corresponding to the target command pressure $P_0$ (=$P_{03c}$) is calculated based on the characteristic of the target drive current table shown in FIG. 28 (step 85). After that, a drive current I (=$I_{3c}$)

corresponding to the target drive current $I_0$ (=$I_{03c}$) is output to the proportional solenoid valve 3 from the proportional solenoid valve driver portion 12c.

Upon the drive current $I_{3c}$ being output to the proportional solenoid valve 3, the proportional solenoid valve 3 outputs a command pressure $P_{3c}$ based on the input/output characteristic A shown in FIG. 22, and the regulator 2 moves the swash plate 1a of the hydraulic pump 1 so as to have an actual pump tilting $\theta_{3c}$ based on the input/output characteristic B shown in FIG. 23.

In the above steps 82, 82X and 83, the target pump tilting $\theta_0$ (=$\theta_{03}$) derived from the negative control pressure Pn (=Pn3) is not set to the target value as it is, but the value $\theta_0+\Delta\theta_0$ which results from calculating the tilting correction value $\Delta\theta_0$ (=$\Delta\theta_{03}$) from the correction formula (Y=KX+C) and then adding the correction value $\Delta\theta_0$ to the target pump tilting $\theta_0$ (=$\theta_{03}$) is set to the target value $\theta_{03c}$. Here, as stated above, the correction formula (Y=KX+C) represents the respective deviations between the actual input/output characteristics A, B and the target input/output characteristics Ao, Bo of the proportional solenoid valve 3 and the regulator 2, and the correction value $\Delta\theta_0$ derived from the correction formula corresponds to the difference between the pump tilting $\theta_3$ based on the target characteristic resulted when the target pump tilting $\theta_0$ is $\theta_{03}$ and the actual pump tilting $\theta_{3c}$. Accordingly, setting the value $\theta_0+\Delta\theta_0$, which results from adding the correction value $\Delta\theta_0$ derived from the correction formula to the target pump tilting $\theta_0$ (=$\theta_{03}$), to the target value $\theta_{03c}$ implies that the error of the actual pump tilting, which would be caused if the drive current $I_3$ is output by using the target pump tilting $\theta_0$ (=$\theta_{03}$) as it is without any correction, is offset in advance. Also, controlling the proportional solenoid valve 3 and the regulator 2 with $\theta_0+\Delta\theta_0$ set to the target value ($\theta_{03c}$) is essentially equivalent to that the proportional solenoid valve 3 and the regulator 2 having the respective target characteristics shown in FIGS. 22 and 23 are controlled with the drive current $I_3$. In other words, the actual pump tilting $\theta_{3c}$ resulted from controlling the proportional solenoid valve 3 and the regulator 2 with $\theta_0+\Delta\theta_0$ set to the target value ($\theta_{03c}$) is the same as the actual pump tilting $\theta_3$ resulted when a target command pressure $P_{03}$ is calculated from the target pump tilting $\theta_{03}$ based on the characteristic shown in FIG. 27, a target drive current $I_{03}$ is calculated from the target command pressure $P_{03}$ based on the characteristic shown in FIG. 28, a drive current $I_3$ corresponding to the target drive current $I_{03}$ is output to the proportional solenoid valve 3, a command pressure $P_3$ corresponding to the drive current $I_3$ is output based on the target characteristic Ao shown in FIG. 22, and the swash plate 1a of the hydraulic pump 1 is moved under the command pressure $P_3$ based on the target characteristic Bo shown in FIG. 23.

Likewise, when the negative control pressure Pn generated in the line 16 is other than Pn3, the actual pump tilting $\theta_c$ resulted from deriving the tilting correction value $\Delta\theta_0$ from the correction formula and correcting the target pump tilting $\theta_0$ by addition of the correction value $\Delta\theta_0$ is also the same as the actual pump tilting $\theta$ resulted through the control based on the target characteristics shown in FIGS. 22 and 23 without correcting the target pump tilting $\theta_0$.

With this embodiment, therefore, even in the case where the characteristics of the proportional solenoid valve 3 and the regulator 2 are varied one by one within the range of tolerance and have different gradients from the target characteristics, the same pump tilting as the actual pump tilting $\theta$ which results through the control based on the target characteristics shown in FIGS. 2 and 3 can be always achieved. Accordingly, variations in the actual pump tilting with respect to the target pump tilting $\theta_0$ can be reduced.

Figure 31:
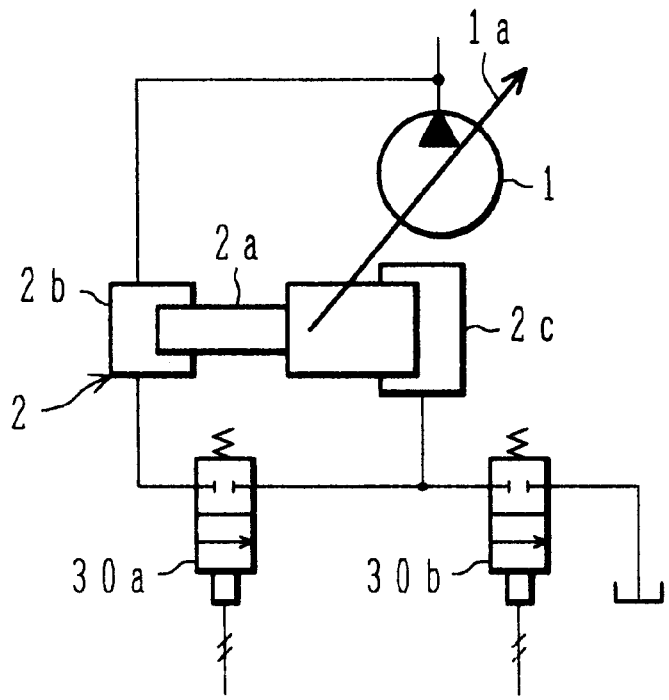
FIG. 31 is a diagram showing another form of the regulator.

The foregoing embodiments have been described in connection with the exemplified case where displacement control means for the variable displacement hydraulic pump 1 as an object to be controlled by the controller 12 is a combination of the proportional solenoid valve 3 and the regulator 2. However, the present invention is not limited to the foregoing embodiments, and the displacement control means may be a combination of high-speed solenoid valves 30a, 30b and the regulator 2 as shown in FIG. 31. In this case, when the high-speed solenoid valve 30b is held in a closed state and the high-speed solenoid valve 30a is switched to an open state in response to a drive current I from the controller 12, the hydraulic fluid from the variable displacement hydraulic pump 1 is supplied to both the smaller-diameter side chamber 2b and the larger-diameter side chamber 2c. Therefore, the difference in pressure bearing area between the smaller-diameter side chamber 2b and the larger-diameter side chamber 2c causes the servo piston 2a to move to the left as viewed on the drawing. On the other hand, when the high-speed solenoid valve 30a is held in a closed state and the high-speed solenoid valve 30b is switched to an open state in response to a drive current I from the controller 12, the communication between the smaller-diameter side chamber 2b and the larger-diameter side chamber 2c is cut off, the larger-diameter side chamber 2c is communicated with the reservoir, and the hydraulic fluid from the variable displacement hydraulic pump 1 is supplied to the smaller-diameter side chamber 2b alone, thus causing the servo piston 2a to move to the right as viewed on the drawing. In accordance with the above-mentioned movement of the servo piston 2a, the swash plate 1a is operated to control the displacement of the variable displacement hydraulic pump 1.

Figure 32:
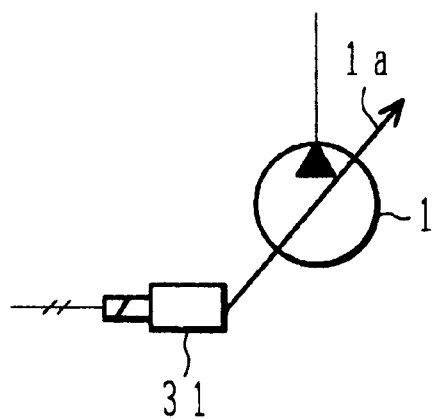
FIG. 32 is a diagram showing still another form of the regulator.

Further, the displacement control means for the variable displacement hydraulic pump 1 may comprise a proportional solenoid 31 as shown in FIG. 32. In this case, the controller outputs a drive current I corresponding to the target pump tilting $\theta_0$, and the proportional solenoid 31 generates an electromagnetic force in proportion to the drive current I. A spool (not shown) is moved in accordance with the electromagnetic force, and the swash plate 1a is moved in accordance with the movement of the spool to control the displacement of the variable displacement hydraulic pump 1.

Figure 33:
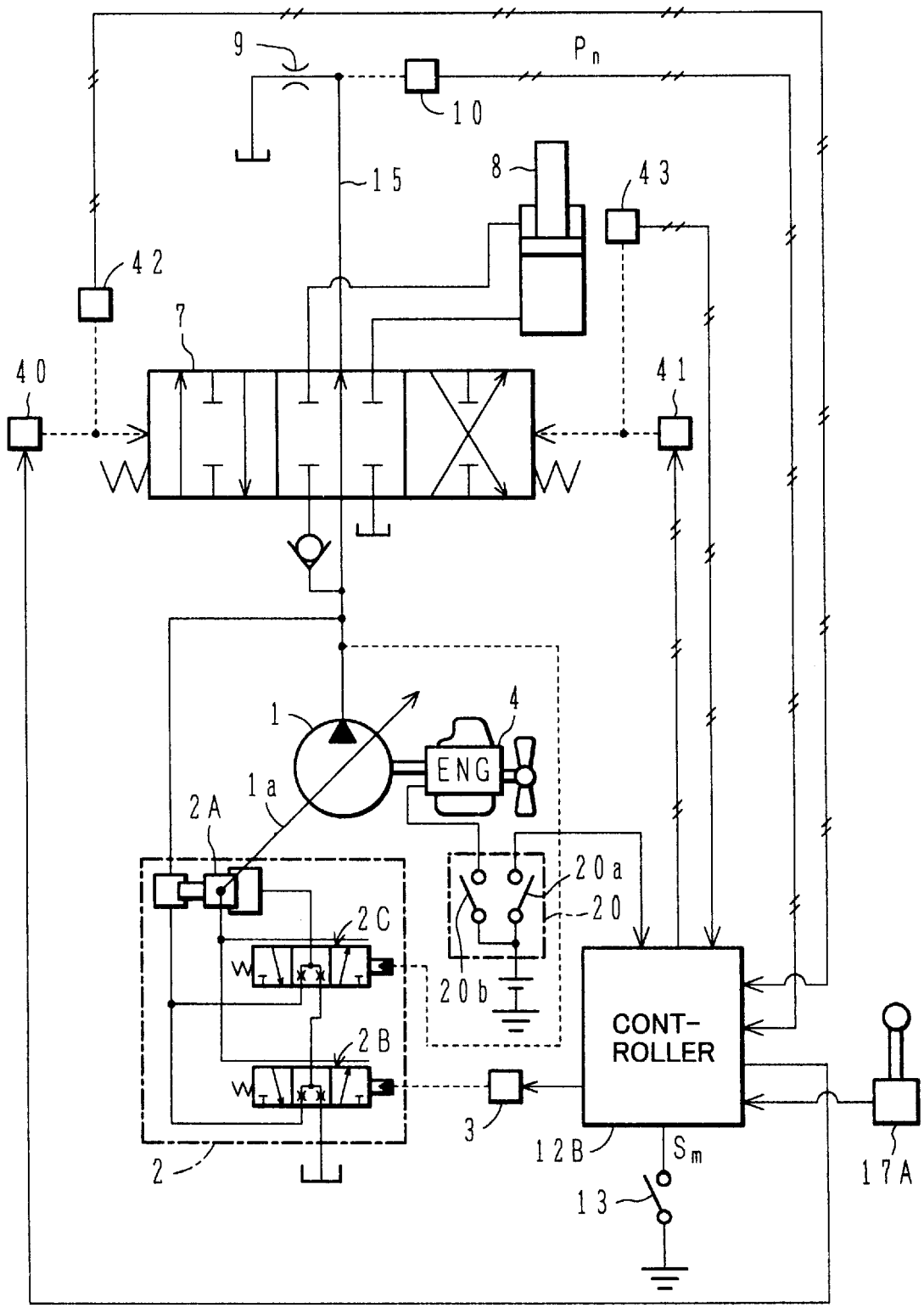
FIG. 33 is a diagram of a hydraulic circuit including a flow control valve control system according to the fourth embodiment of the present invention.

A fifth embodiment of the present invention will be described with reference to FIGS. 33 to 35. This embodiment illustrates, as another example of the control object other than the displacement control means for the hydraulic pump, a proportional solenoid valve for outputting command pilot pressures to the flow control valve. In FIG. 33, the same members as shown in FIG. 1 are denoted by the same reference numerals.

Referring to FIG. 33, denoted by 17A is an electric lever unit. An input signal (electric signal) from the electric lever unit 17A is input to a controller 12B. The controller 12B outputs drive currents to proportional solenoid valves 40, 41 as control objects, whereupon the proportional solenoid valves 40, 41 are driven by the drive currents to produce command pressures. The flow control valve 7 is operated under the command pressures to control the flow rate of the hydraulic fluid supplied to the hydraulic actuator 8. Further, the command pressures produced by the proportional solenoid valves 40, 41 are detected by pressure sensors 42, 43, respectively, and electric signals corresponding to the detected values are input to the controller 12B.

Figure 34:
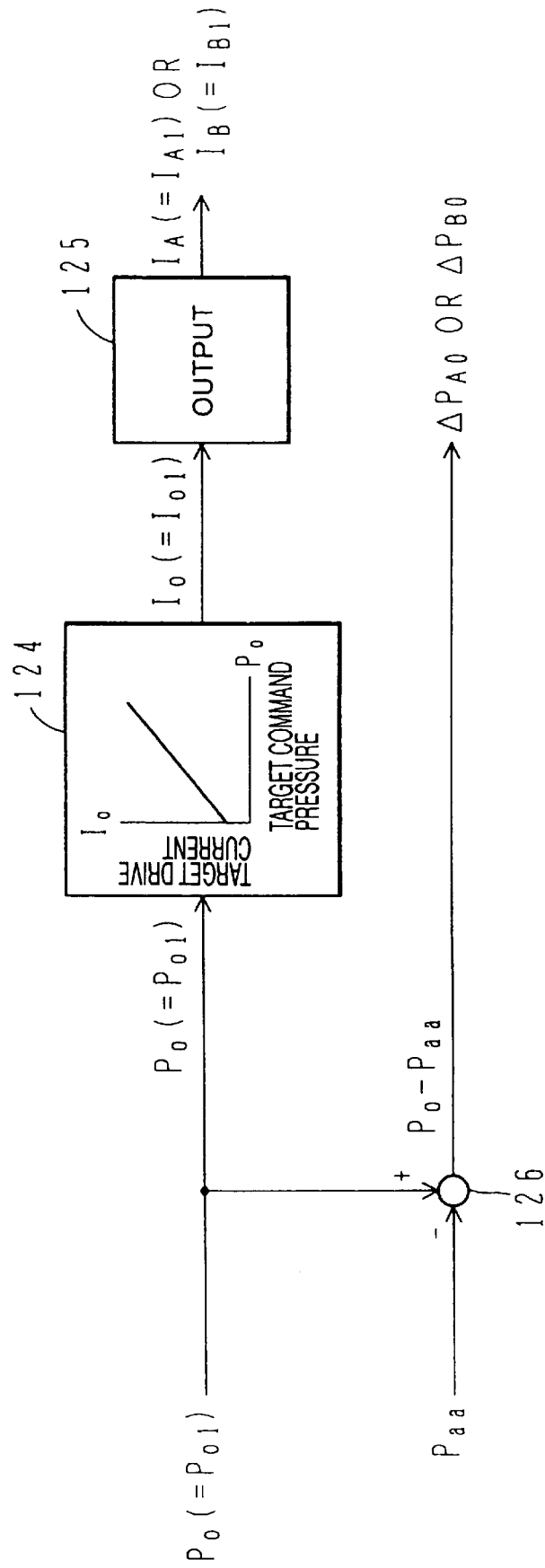
FIG. 34 is a functional block diagram showing an outline of processing procedures of a learning control mode according to the embodiment shown in FIG. 33.

An outline of a learning calculation process in the learning control mode is shown in a functional block diagram of FIG. 34. In a block 124, a target drive current $I_0$ (=$I_{01}$) corresponding to the target command pressure $P_0$ (=$P_{01}$) set to a predetermined pressure value $P_{01}$ is calculated based on the characteristic of a target drive current table. The characteristic of the target drive current table is a reversal, i.e., the reverse, of the target input/output characteristic of the proportional solenoid valve 40. In a block 125, a drive current $I_A$ (32 $I_{A1}$) corresponding to the target drive current $I_{01}$ is determined and then output to the proportional solenoid valve 40. A command pressure P produced by the proportional solenoid valve 40 is detected by the pressure sensor 42. An averaged actual command pressure $P_{aa}$ is subtracted from the target command pressure $P_0$ (=$P_{01}$) in a subtracter 126 to provide a correction value $\Delta P_{A0}$. Similarly, a drive current $I_B$ is output to the proportional solenoid valve 41 and a correction value $\Delta P_{B0}$ is provided. The correction values $\Delta P_{A0}$, $\Delta P_{B0}$ represent respective deviations between the actual input/output characteristics and the target input/output characteristics of the proportional solenoid valves 40, 41.

Figure 35:
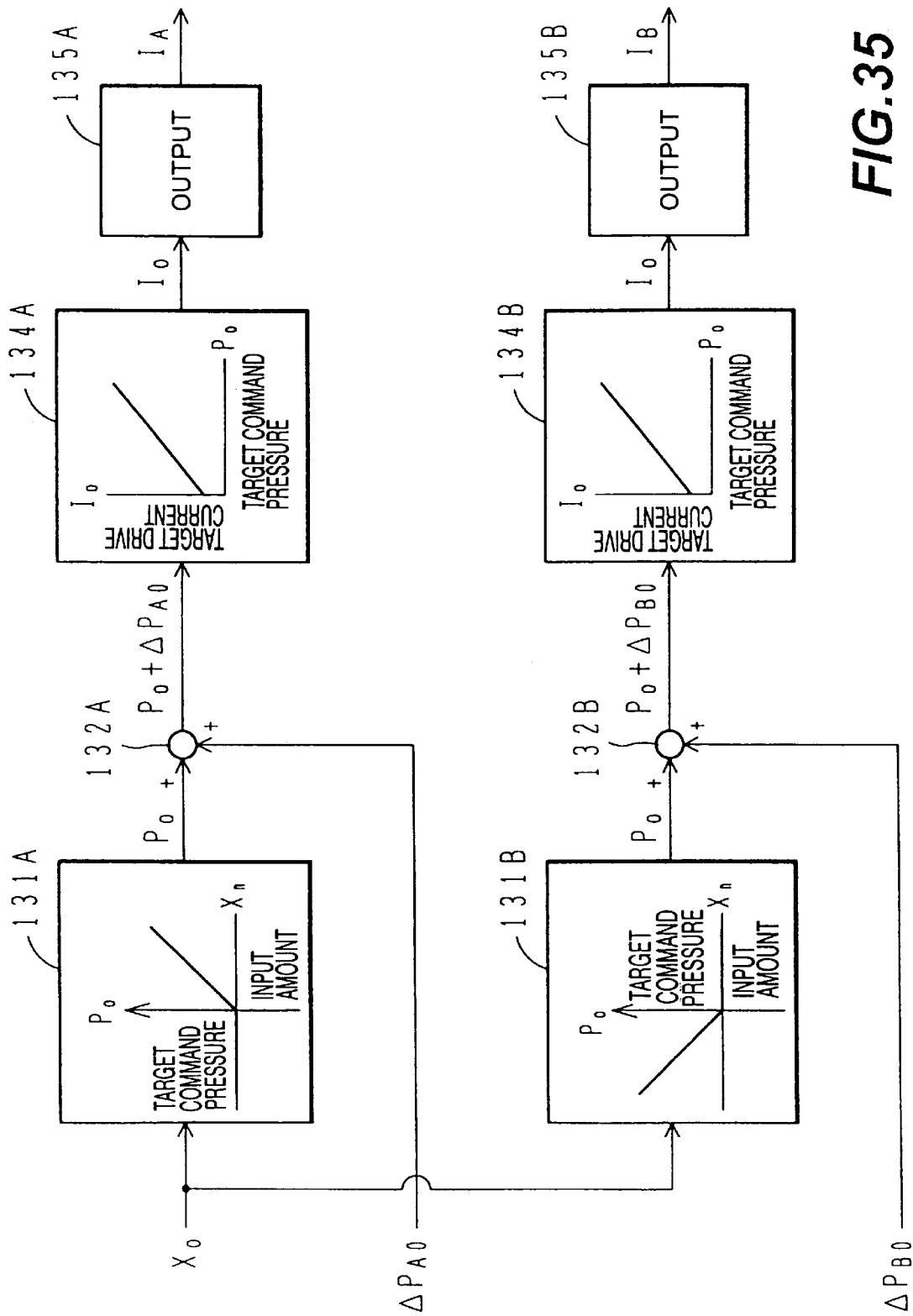
FIG. 35 is a functional block diagram showing an outline of processing procedures of a normal control mode according to the embodiment shown in FIG. 33.

An outline of a process in the normal control mode is shown in a functional block diagram of FIG. 35. In blocks 131A and 131B, target command pressures $P_0$ corresponding to an input signal $X_0$ from the electric lever unit 17A at that time are calculated based on the characteristics of target command pressure tables depending on the direction in which the flow control valve 7 is operated. In adders 132A and 132B, the foregoing correction values $\Delta P_{A0}$, $\Delta P_{B0}$ are added to the respective target command pressures $P_0$ to derive corrected target command pressures. In other words, the errors of actual command pressures, which would be caused if the drive currents $I_A$, $I_B$ are output by using the target command pressures $P_0$ ($P_{01}$) as they are without any correction, are offset in advance. Then, in blocks 134A and 134B, target drive currents $I_0$ corresponding to the corrected target command pressures $P_0$ are calculated based on the characteristics of target drive current tables. The characteristics of the target drive current table are also a reversal, i.e., the reverse, of the target input/output characteristic of the proportional solenoid valves 40, 41. In blocks 135A and 135B, drive currents $I_A$, $I_B$ corresponding to the target drive currents $I_0$ are determined and then output to the proportional solenoid valves 40, 41, respectively.

With this embodiment, therefore, even when the characteristics of the proportional solenoid valves 40, 41 are varied one by one within the range of tolerance in a control system in which the proportional solenoid valves 40, 41 are employed as objects to be controlled by the controller 12B, variations in the actual command pressures with respect to the target command pressures $P_0$ can be reduced. Also, since the normal control mode is performed under open loop control, there occurs no response delay and, even if the pressure sensors 42, 43 should fail, the working machine is able to continue the normal operation.

INDUSTRIAL APPLICABILITY

According to the present invention, even when input/output characteristics of control objects are varied one by one, the output of each control object can be controlled to be always equal to a target value and variations in the output can be reduced. Also, since normal control is performed under open loop control, there occurs no response delay and, even if sensors or the like should fail, working machines are able to continue the normal operation.

Further, according to the present invention, even when an input/output characteristic of displacement control means is varied one by one, an actual pump tilting as an output of the displacement control means can be controlled to be always equal to a target pump tilting and variations in the actual pump tilting can be reduced. It is therefore possible to improve the fine operability and a feeling in the operation of hydraulic working machines, and increase the working efficiency thereof.

What is claimed is:

1. An output correcting method in a control system wherein a reverse characteristic having a reverse input/output relationship to a target input/output characteristic of a control object, is preset, and a target value for an output of the control object is calculated, and then a command signal corresponding to the target value is determined based on the preset reverse characteristic, and the command signal is output to said control object, said method comprising:

a first step of calculating a command signal corresponding to a given target value for the output of said control object based on said preset reverse characteristic, outputting the command signal to said control object, measuring an output of said control object and estimating a deviation between an actual input/output characteristic of said control object and said target input/output characteristic therefor, and storing data on the deviation between the input/output characteristics as learning correction data, and a second step of reading out the stored learning correction data and correcting the command signal using the learning correction data.

2. A control system wherein a reverse characteristic having a reverse input/output relationship to a target input/output characteristic of a control object, is preset, and a target value for an output of the control object is calculated, and then a command signal corresponding to the target value is determined based on the preset reverse characteristic, and the command signal is output to said control object, said control system comprising:

first means for calculating a command signal corresponding to a given target value for the output of said control object based on said preset reverse characteristic, outputting the command signal to said control object, measuring an output of said control object and estimating a deviation between an actual input/output characteristic of said control object and said target input/output characteristic therefor, and storing data on the deviation between the input/output characteristics as learning correction data, and second means for reading out the stored learning correction data and correcting the command signal using the learning correction data.

3. A control system according to claim 2, wherein said first means calculates a difference between the given target value and the measured output value as a correction value and stores said correction value as said learning correction data, and said second means corrects said command signal by using the correction value.

4. A control system according to claim 2, wherein said first means calculates at least two differences between the given target value and the measured output value, obtains a correction formula from said two differences and stores said correction formula as said learning correction data, and said second means calculates, as a correction value, the difference between the target value at that time and the corresponding measured output value by using said correction formula and corrects said command signal by using the calculated correction value.

5. A control system according to claim 3, wherein said second means corrects said command signal by adding said correction value to the target value at that time.

6. A control system according to claim 3, wherein said second means shifts the characteristic used for calculating said command signal from the target value of output for said control object in an amount corresponding to said correction value, and corrects said command signal by calculating a command signal corresponding to the target value at that time from the shifted characteristic.

7. A control system according to claim 2, wherein said control object includes displacement control means for a variable displacement hydraulic pump, and said target value is a target displacement of said hydraulic pump.

8. A hydraulic pump control system wherein a reverse characteristic having a reverse input/output relationship to a target input/output characteristic of displacement control means for a variable displacement hydraulic pump, is preset, and a target displacement as a target value for an output of said displacement control means is calculated, and then a command signal corresponding to the calculated displacement is determined based on the preset reverse characteristic, and the command signal is output to said displacement control means for controlling the displacement of said hydraulic pump, said control system comprising:

measuring means for measuring an actual displacement of said hydraulic pump, mode selecting means for selecting one of a learning control mode and a normal control mode, learning calculation means for, upon the learning control mode being selected by said mode selecting means, calculating a command signal corresponding to a given target displacement based on said preset reverse characteristic, outputting the command signal to said displacement control means, measuring an actual displacement of said hydraulic pump by said measuring means, calculating a difference between said given target displacement and the actual displacement and storing data on the deviation as learning correction data, and learning correction means for, upon the normal control mode being selected by said mode selecting means, reading out the stored learning correction data and correcting said command signal using the learning correction data.

9. A hydraulic pump control system according to claim 8, wherein said learning calculation means, as a correction value, said difference between the given target displacement and the actual displacement and stores said correction value as said learning correction data.

10. A hydraulic pump control system according to claim 8, wherein said learning calculation means calculates said difference between the given target displacement and the actual displacement for each of at least two different target displacements, determines a correction formula from data of said difference resulting from said at least two different target displacements, and stores said correction formula as said learning correction data, and said learning correction means calculates, as a correction value, the difference between the target displacement at that time and the corresponding actual displacement by using said correction formula, and corrects said command signal by using the calculated correction value.

11. A hydraulic pump control system according to claim 10, wherein said learning calculation means derives said correction formula as a correlation formula defined on a coordinate system with one axis representing said target displacement and the other axis representing said difference between the given target displacement and the actual displacement.

12. A hydraulic pump control system according to claim 10, wherein said learning correction means corrects said command signal by adding said correction value to the target displacement at that time.

13. A hydraulic pump control system according to claim 9, wherein said learning correction means shifts the characteristic used for calculating said command signal from said target displacement in an amount corresponding to said correction value, and corrects said command signal by calculating a command signal corresponding to the target displacement at that time from the shifted characteristic.

14. A hydraulic pump control system according to claim 8, wherein said learning calculation means includes a non-volatile memory in which data once stored will not be lost even after power is cut off, and stores said learning correction data in said non-volatile memory.

15. A hydraulic pump control system according to claim 8, wherein said mode selecting means includes switch means for instructing changeover between the learning control mode and the normal control mode so that one of the learning control mode and the normal control mode is selected in response to turning on/off of said switch means.

16. A hydraulic pump control system according to claim 8, wherein said learning calculation means determines whether the revolution speed of a prime mover for driving said hydraulic pump is within a predetermined range and whether a condition of the revolution speed being in said predetermined range has continued for a predetermined time, and only when said determination is satisfied, said learning calculation means calculates the command signal corresponding to said given target displacement and outputs the command signal to said displacement control means.

17. A hydraulic pump control system according to claim 8, wherein when outputting said command signal to said displacement control means and measuring an actual displacement, said learning calculation means continues outputting said command signal for a predetermined time to stabilize the displacement of said hydraulic pump and, under a stabilized condition, measures said actual displacement by said measuring, and further said learning calculation means receives a measured value of the actual displacement a predetermined number of times and calculates a difference between an averaged value of the actual displacement and said given target displacement.

18. A hydraulic pump control system according to claim 8, wherein prior to outputting said command signal to said displacement control means, said learning calculation means outputs a command signal corresponding to a minimum target displacement to said displacement control means, thereby minimizing the target displacement of said hydraulic pump.

* * * * *